NORMALIZING APPARATUS FOR FLOATING POINT OPERATIONS

Filed Sept. 8, 1959 30 Sheets-Sheet 1

INVENTORS
JOSEPH L. BROWN
EDWARD C. LAYDEN
JORDAN M. TAYLOR
DONALD H. WEISS

BY Marshall M. Truex
ATTORNEY

NORMALIZING APPARATUS FOR FLOATING POINT OPERATIONS

ADDER & TRUE/COMP CNTLS COLS 2 & 4

July 10, 1962 J. L. BROWN ETAL 3,043,509

NORMALIZING APPARATUS FOR FLOATING POINT OPERATIONS

Filed Sept. 8, 1959 30 Sheets-Sheet 4

ADDER & TRUE/COMP CNTLS COLS 6, 7, 8

ACC REG COLUMNS (9-34)

July 10, 1962 J. L. BROWN ETAL 3,043,509
NORMALIZING APPARATUS FOR FLOATING POINT OPERATIONS
Filed Sept. 8, 1959 30 Sheets-Sheet 7
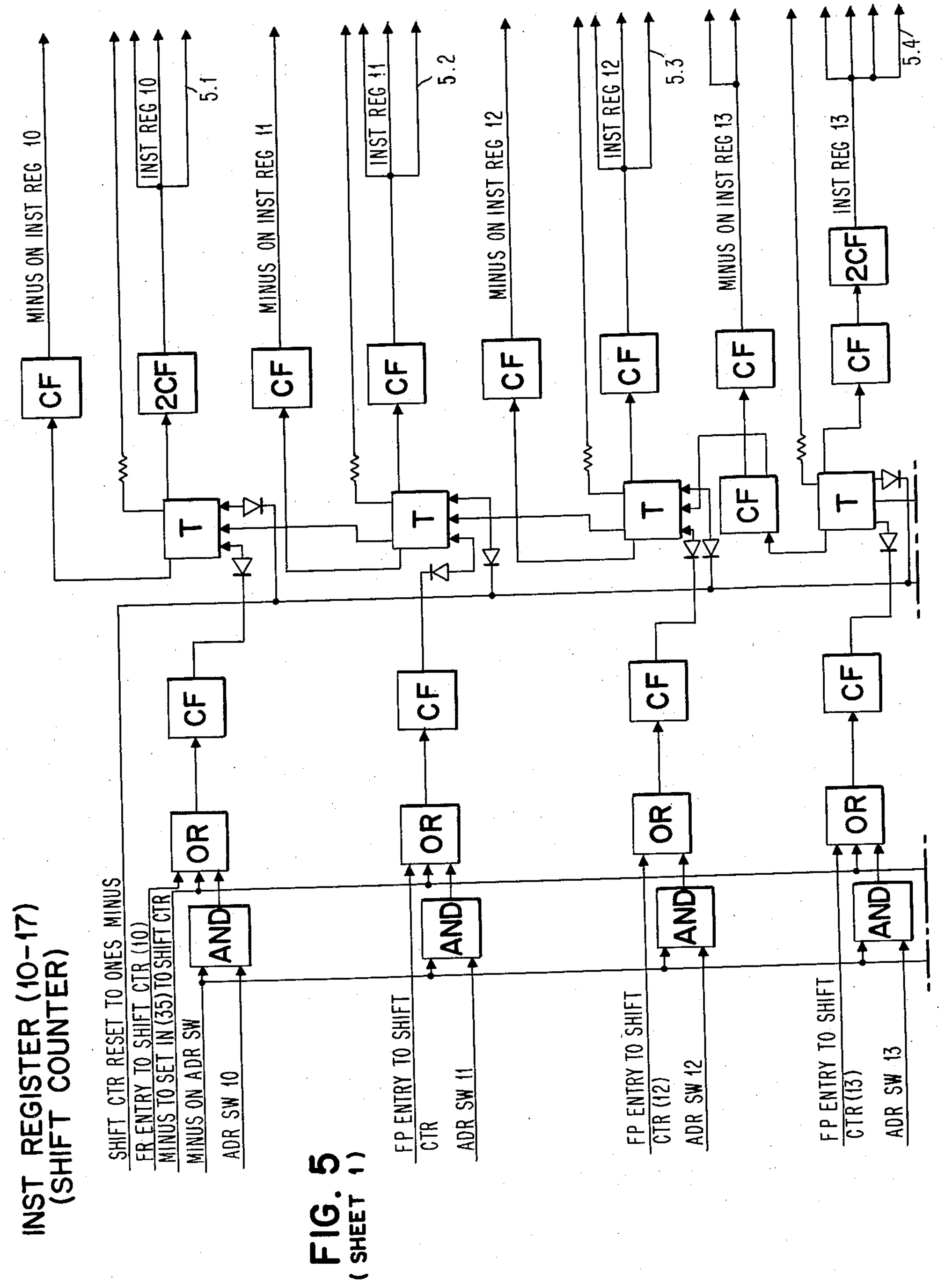
FIG. 5 (SHEET 1)

July 10, 1962 J. L. BROWN ETAL 3,043,509
NORMALIZING APPARATUS FOR FLOATING POINT OPERATIONS
Filed Sept. 8, 1959 30 Sheets-Sheet 8
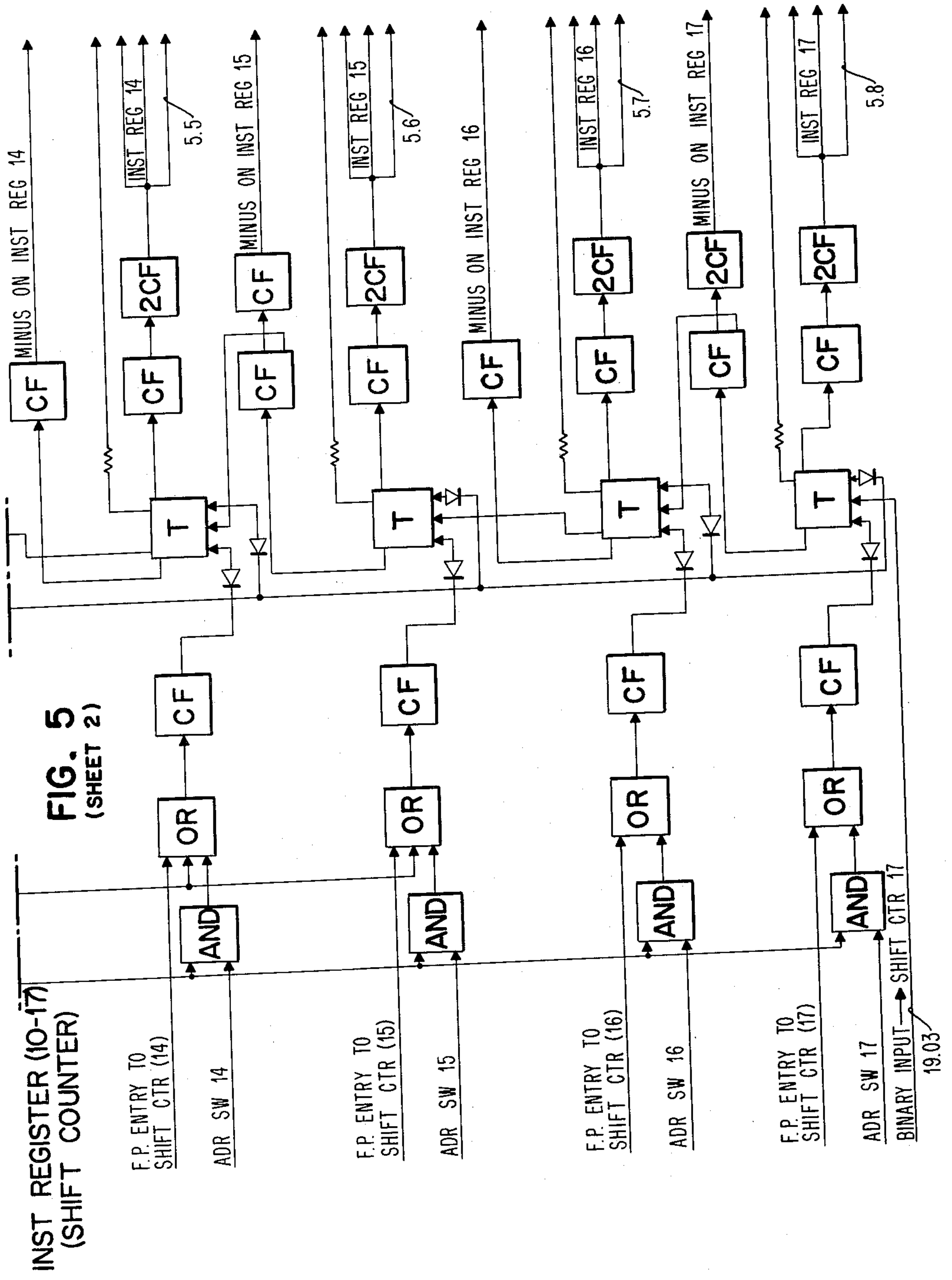
FIG. 5 (SHEET 2)

July 10, 1962 J. L. BROWN ETAL 3,043,509
NORMALIZING APPARATUS FOR FLOATING POINT OPERATIONS
Filed Sept. 8, 1959 30 Sheets-Sheet 9
F P ADD/SUB EXEC CNTLS
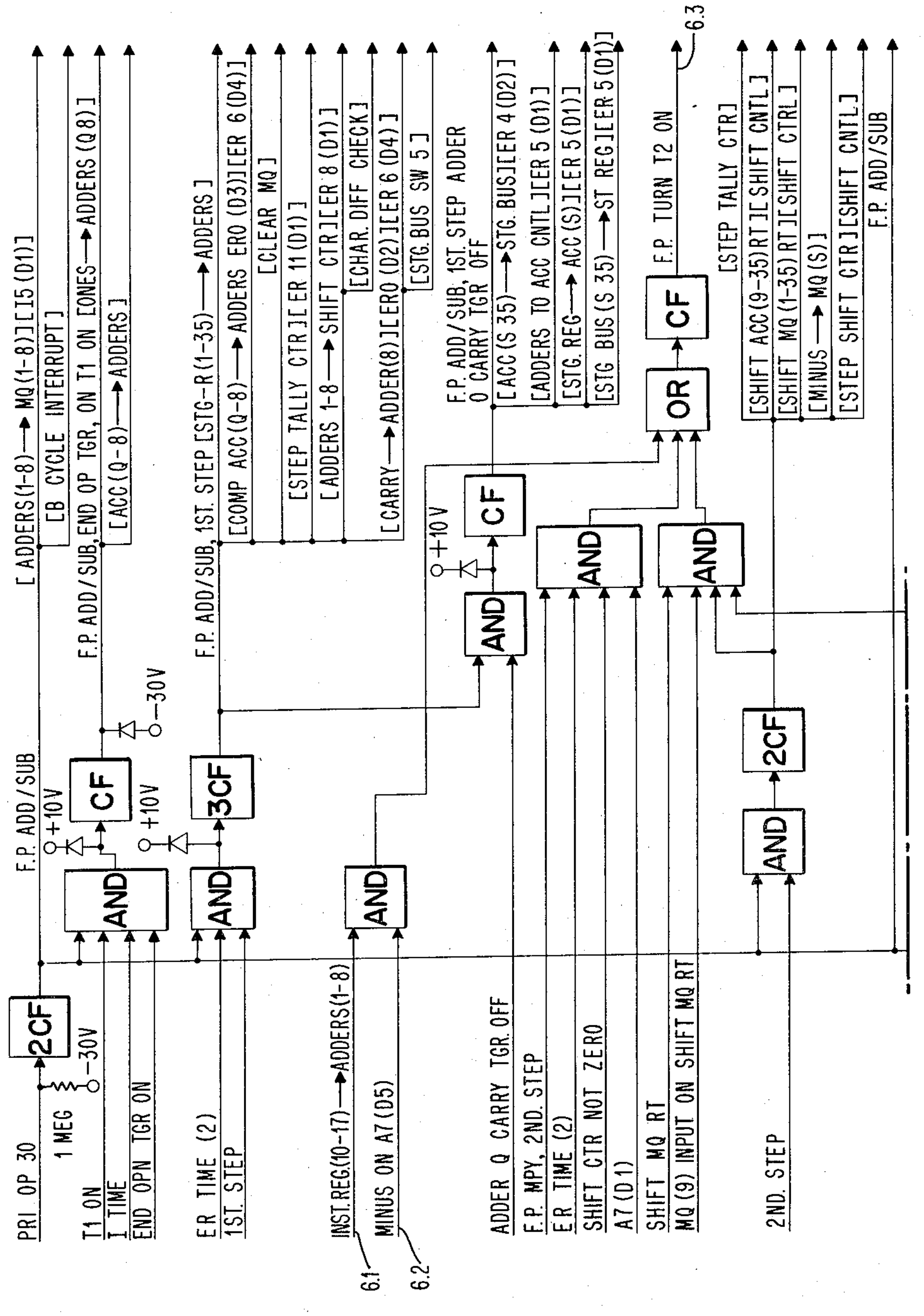
FIG. 6 (SHEET 1)

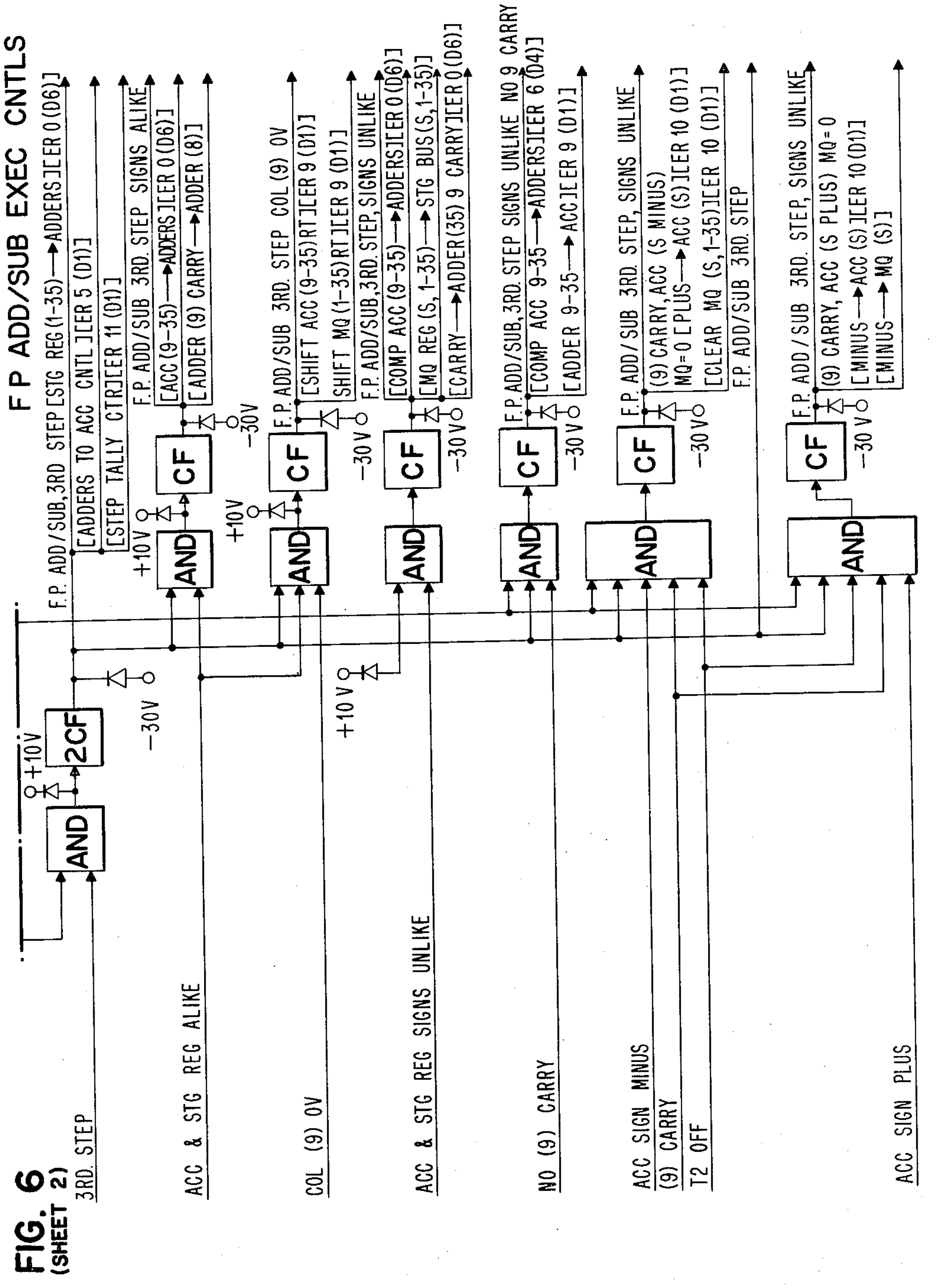
FIG. 6 (SHEET 2)

FIG. 7 (SHEET 1)
F P ADD/SUB EXEC CNTLS
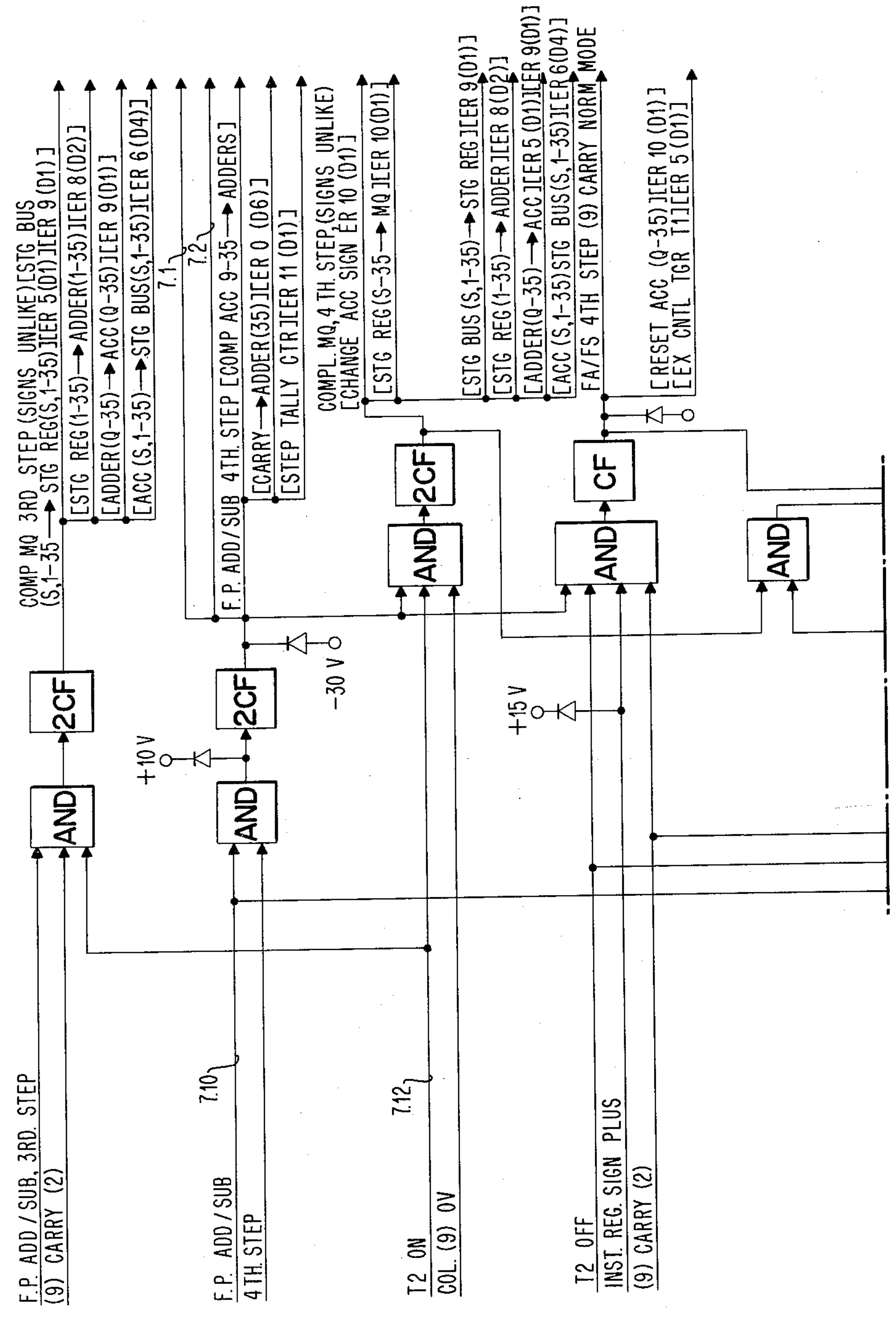

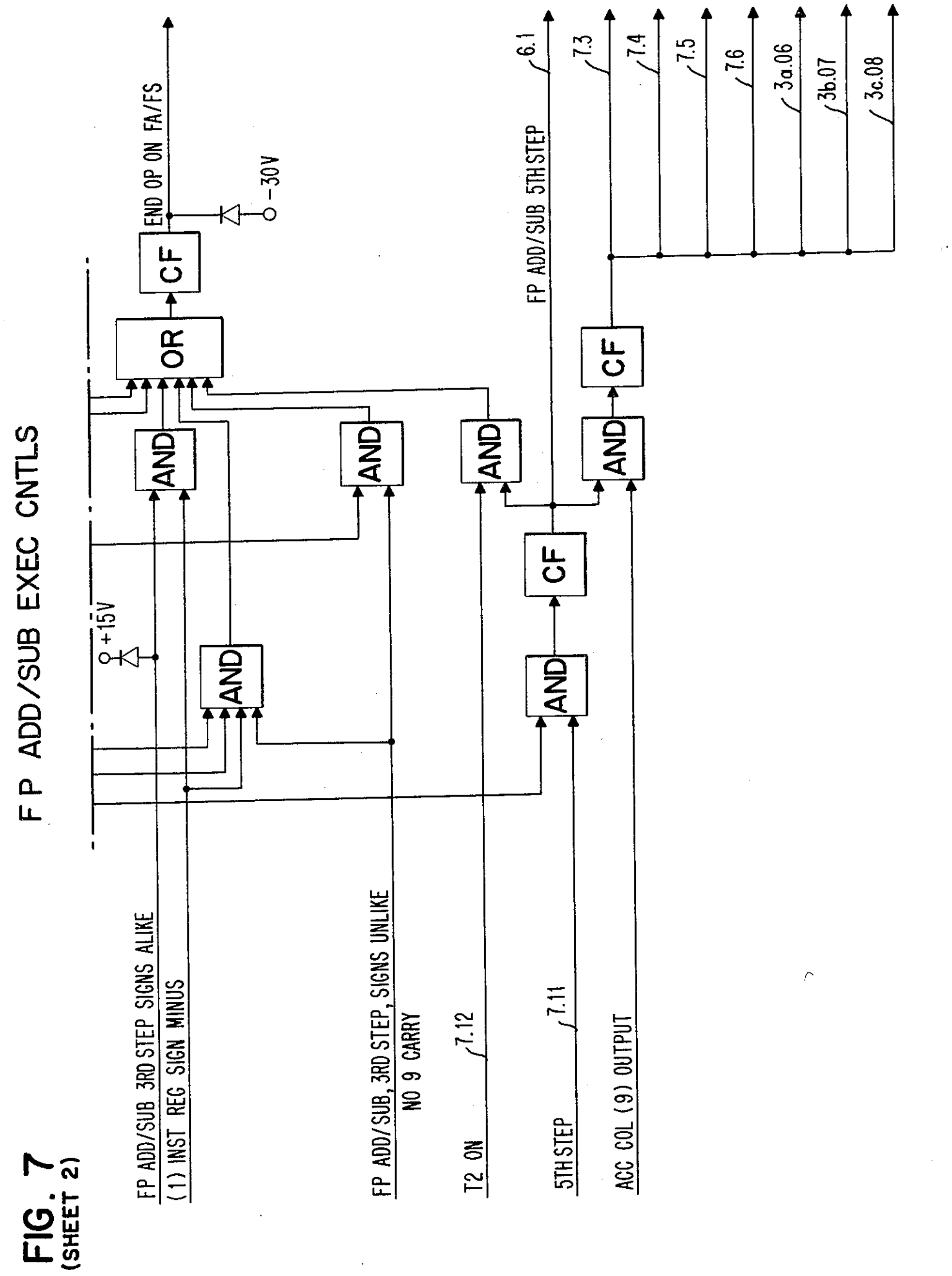
FIG. 7 (SHEET 2)

MPY/MPYR, F P MPY TGR AND SHIFT/STEP CONTROL

INVERTER TRIGGER $T_2$

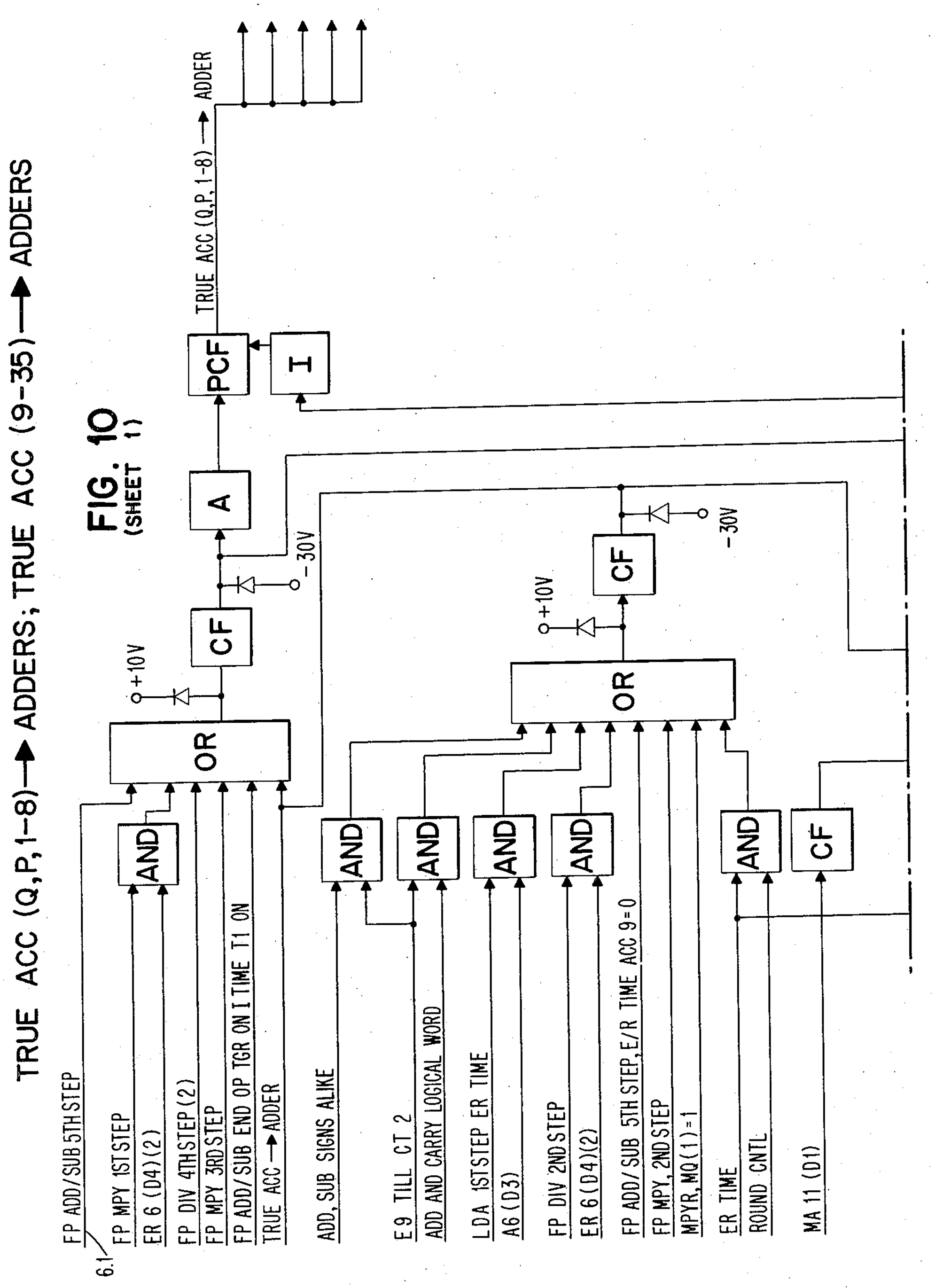
FIG. 10 (SHEET 1)

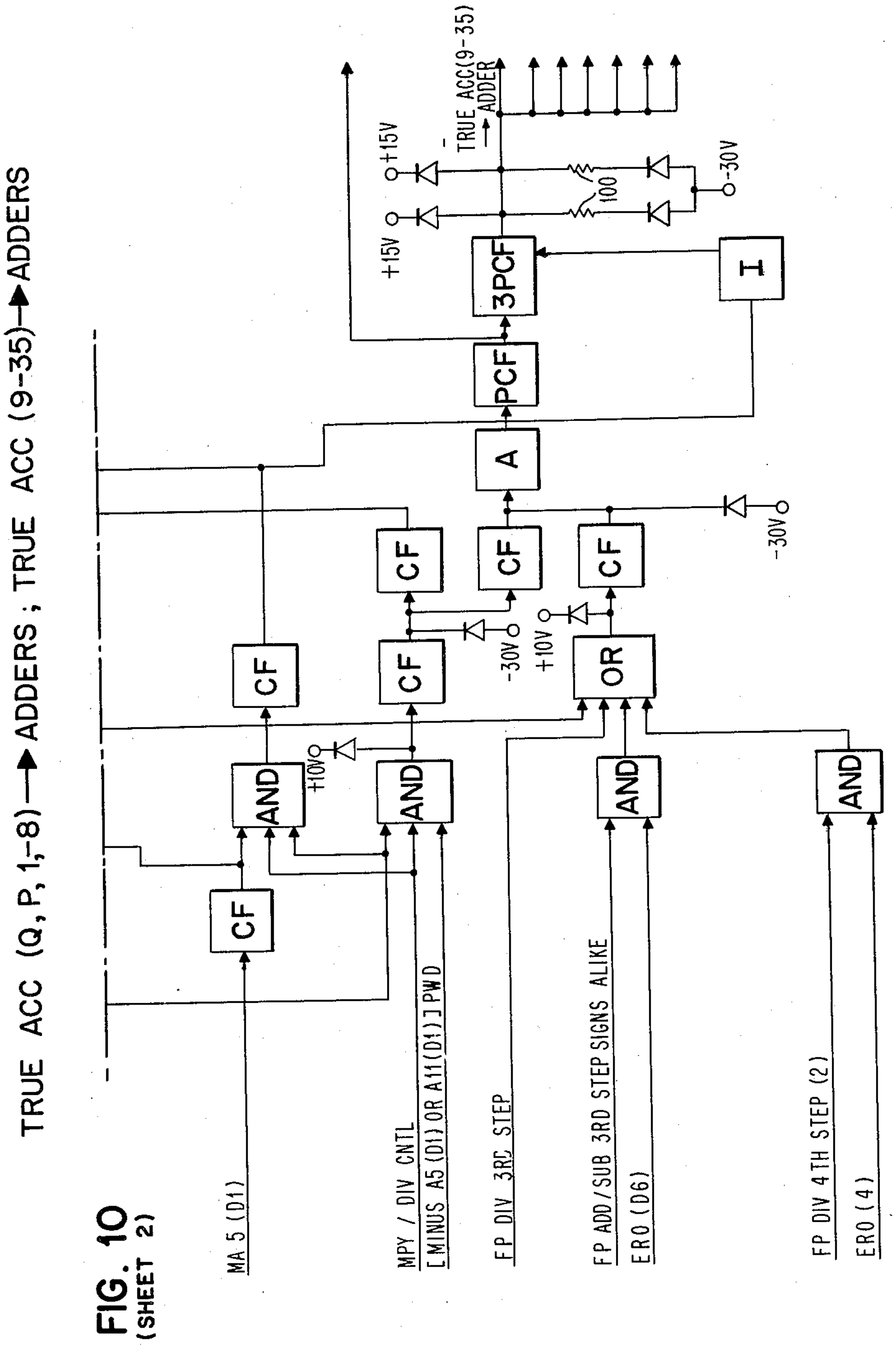
FIG. 10 (SHEET 2)

ADDER (Q, P, 1-8) TO ACC; ADDER (9-35) TO ACC

July 10, 1962 J. L. BROWN ETAL 3,043,509

NORMALIZING APPARATUS FOR FLOATING POINT OPERATIONS

Filed Sept. 8, 1959 30 Sheets-Sheet 18

SHIFT ACC LEFT

MQ (S), (1) OR (9) TO ACC (35), 1 TO ACC (35)

July 10, 1962 J. L. BROWN ETAL 3,043,509

NORMALIZING APPARATUS FOR FLOATING POINT OPERATIONS

Filed Sept. 8, 1959 30 Sheets-Sheet 20

SHIFT MQ LEFT

CARRY ⟶ ADDER (8)

FLOATING POINT TALLY COUNTER

PULSE AND GATE GENERATOR

July 10, 1962 J. L. BROWN ETAL 3,043,509

NORMALIZING APPARATUS FOR FLOATING POINT OPERATIONS

Filed Sept. 8, 1959 30 Sheets-Sheet 28

PULSE AND GATE GENERATOR

COLUMN (9) CARRY & OVERFLOW TRIGGERS

FP ADD/SUB CHAR DIFF TEST

United States Patent Office 3,043,509
Patented July 10, 1962

3,043,509
NORMALIZING APPARATUS FOR FLOATING POINT OPERATIONS

Joseph L. Brown, Poughkeepsie, Edward C. Layden, Hopewell Junction, Jordan M. Taylor, Wappingers Falls, and Donald H. Weiss, Poughkeepsie, N.Y., assignors to International Business Machines Corporation, New York, N.Y., a corporation of New York Filed Sept. 8, 1959, Ser. No. 838,690
6 Claims. (Cl. 235—156)

This invention relates to electronic digital computing devices of the parallel binary type and more particularly for increasing the speed of the normalizing operation.

It is particularly important in modern computing devices that the speed at which certain operations are performed be as fast as possible. The Normalizing operation is one in which an increase in speed is achieved in the minimum of time by the apparatus disclosed herein.

The apparatus illustrated and described is of the pure binary type capable of operating either on whole numbers or normalized and unnormalized floating point numbers having fraction and exponent portions. Addition performed with numbers expressed in floating point decimal form is, for example:

$$\begin{array}{r} .1000000\times 10^{3} \\ -.1009000\times 10^{0} \end{array}$$

Before addition, the lower number is shifted to the right with a compensating change in the exponent and the numbers are added as follows:

$$\begin{array}{r} .1000000\times 10^{3} \\ -.0001009\times 10^{3} \\ \hline .0998991\times 10^{3} \end{array}$$

The digits of the answer must be moved to the left to be in normalized form and the exponent adjusted so that the result is:

$$.998991\times 10^{2}$$

In the computer, a floating point number is actually expressed by a word having a binary fraction and a portion representing the exponent, for example:

| Exponent | Fraction |
|---|---|
| 101 | 001001 |

The fraction above is unnormalized and can be normalized by shifting the fraction to the left until the first "1" bit is in the highest order of the fraction (100100). For each shift, the exponent must be reduced by one so that the value of the fraction and exponent taken together is unchanged.

Previously, the exponent was adjusted for each shift so that the fraction and exponent represented the true binary value at the end of each step of the normalizing operation. However, this involved separate arithmetic operations equal to the number of zeros between the point and the first binary "1" to the right, and delays including carry propagation time had to be allotted time based on the worst case. Because shifting is inherently a high-speed operation, this invention provides that normalizing is accomplished by shifting without adjusting the exponent until the first binary "1" arrives in the position adjacent the imaginary point. The number of shifts are counted as they occur and finally the number of shift operations is used to adjust the exponent during a single arithmetic operation. Accordingly, for those operations in which more than one shift is required, addition time is saved in proportion to the number of zeros encountered.

It is an object of this invention to provide an improved normalizing device.

It is another object of this invention to provide an improved electronic digital computing device of the parallel binary type wherein the speed of the normalizing operation is substantially increased.

Still another object of this invention is to provide a computer for normalizing a floating point number wherein the number of required shifting operations or the fraction is recorded and then used in a single arithmetic operation to adjust the exponent to the proper value.

The foregoing and other objects, features and advantages of the invention will be apparent from the following more particular description of a preferred embodiment of the invention, as illustrated in the accompanying drawings.

Figure 3A:
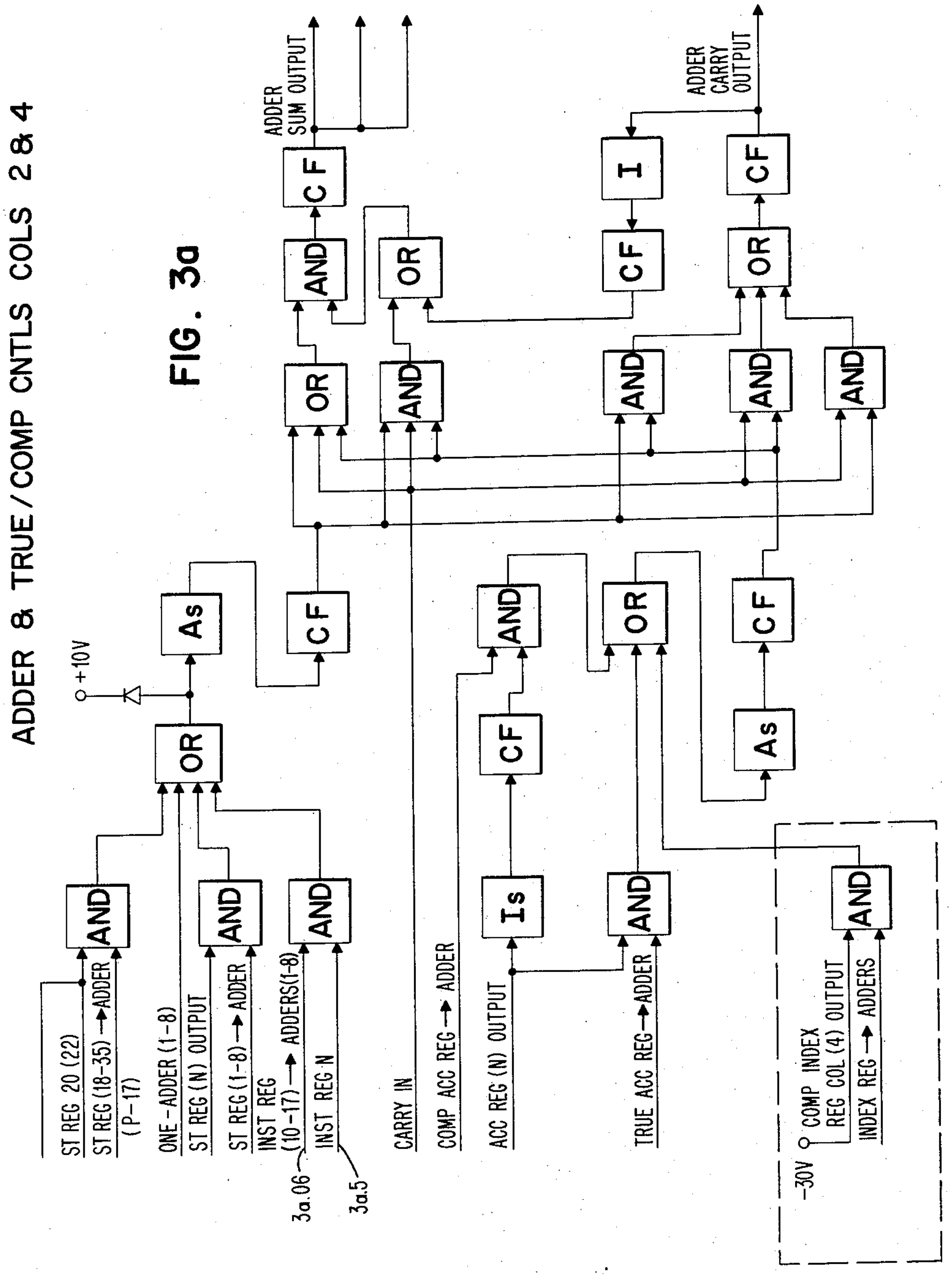
Figure 3B:
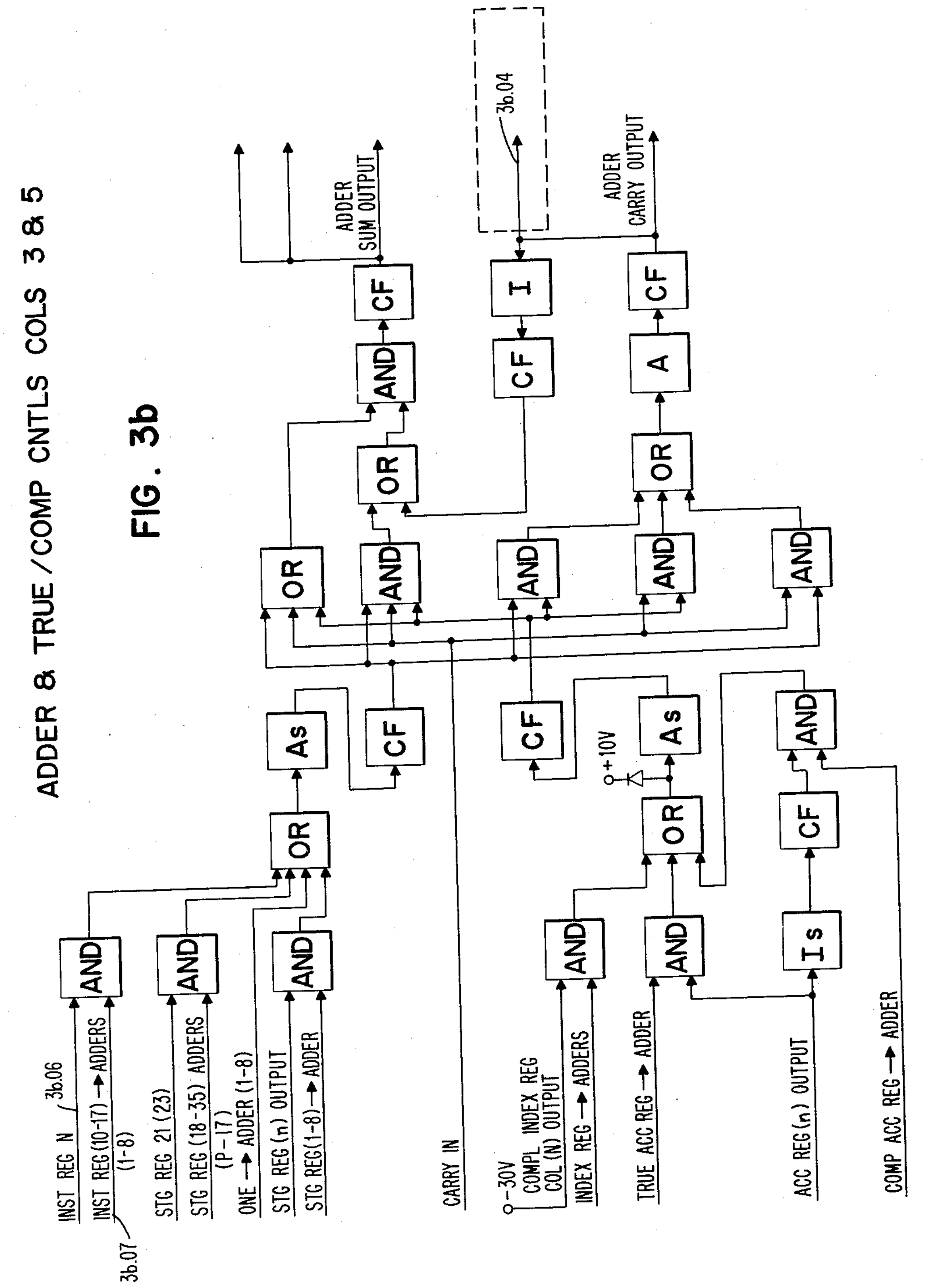
Figure 3C:
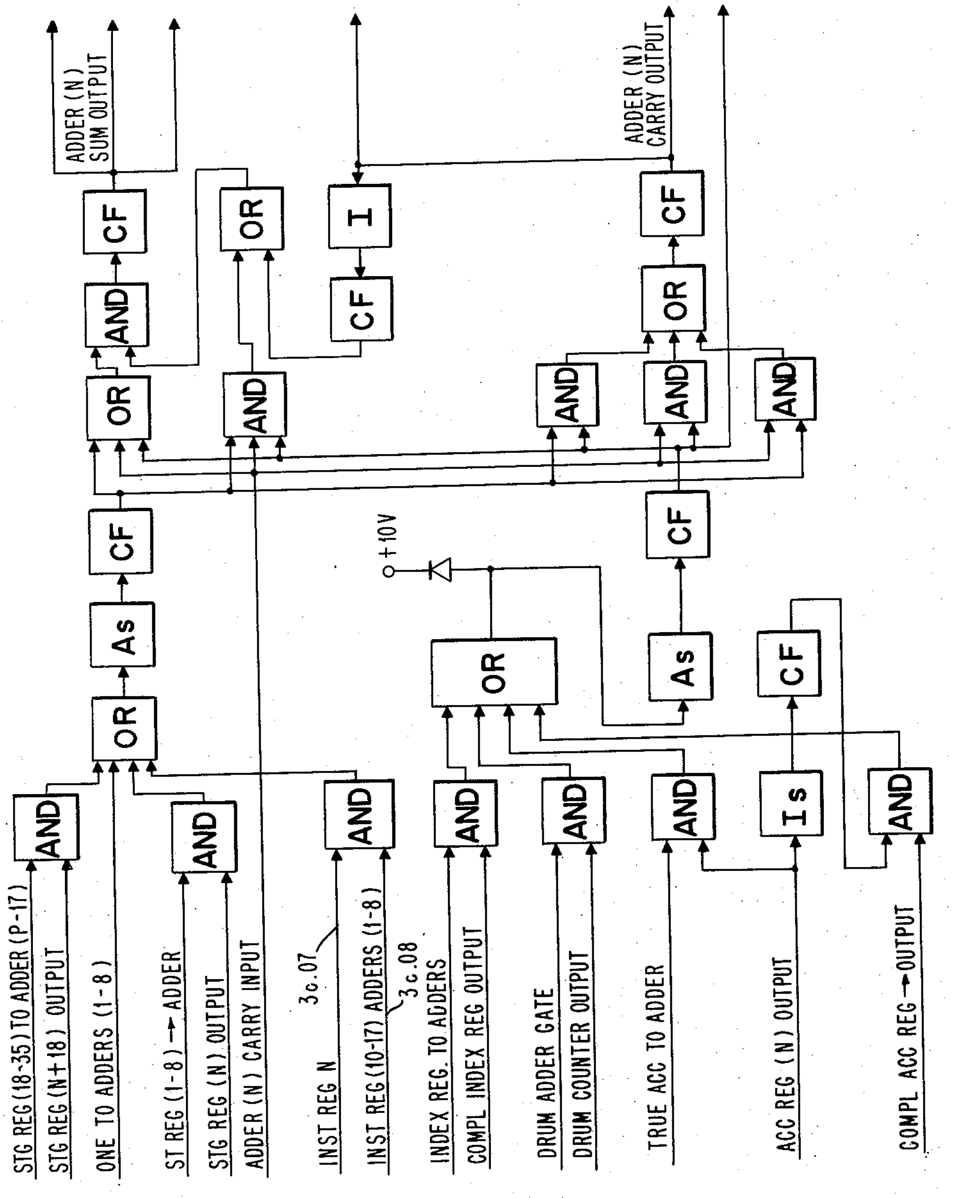

FIGURES 3*a*, 3*b* and 3*c* are logical block diagrams of the Adder and True/Complement Controls.

Figure 4:
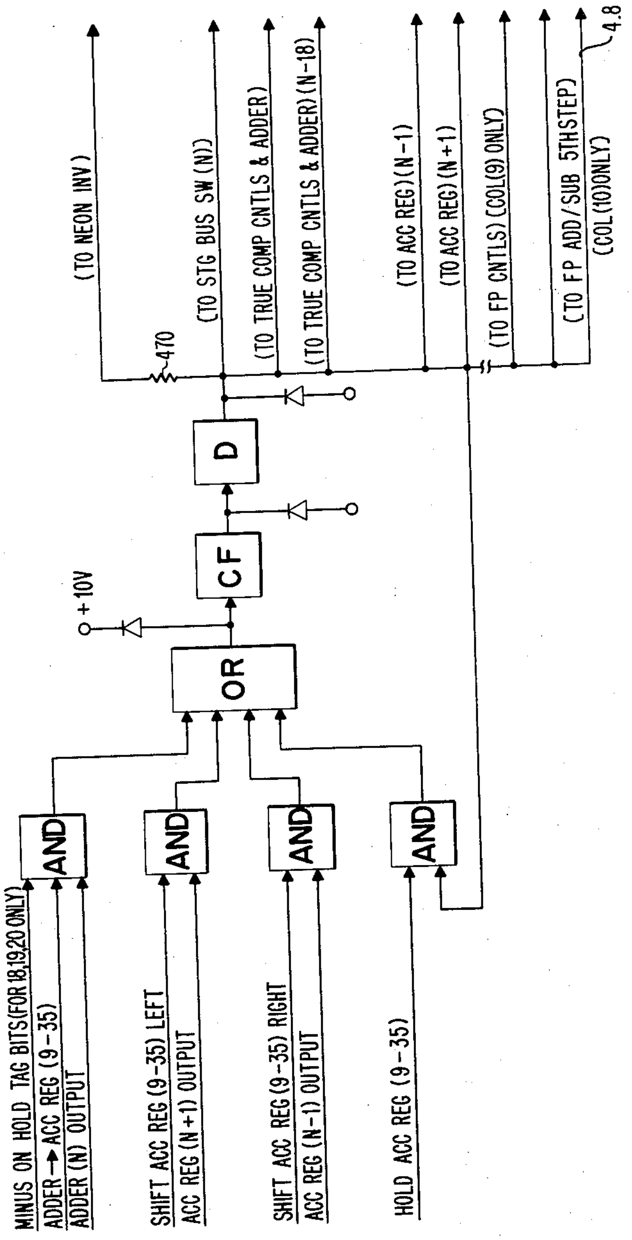

FIGURE 4 is a logical block diagram of the Accumulator Register Columns (9–34).

FIGURE 5 (2 sheets) comprises a logical block diagram of the Instruction Register (Shift Counter).

FIGURE 6 (2 sheets) is a logical block diagram of the Floating Point Add/Subtract Execution Controls.

FIGURE 7 (2 sheets) is a logical block diagram of additional Floating Point Add/Subtract Controls.

Figure 8:
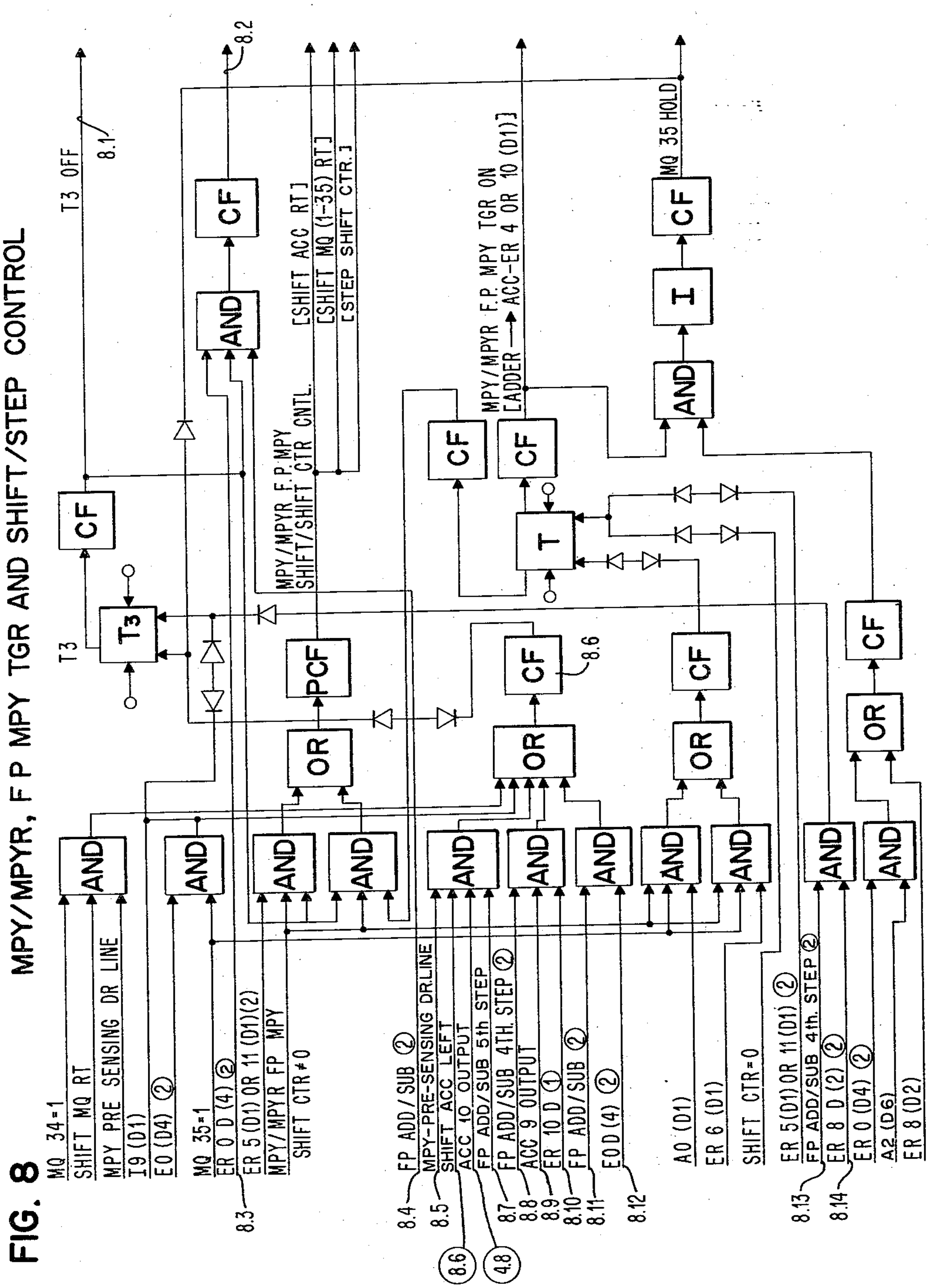

FIGURE 8 is a logical block diagram of MPY/MPYR, FP MPY Trigger and Shift/Step Control.

Figure 9:
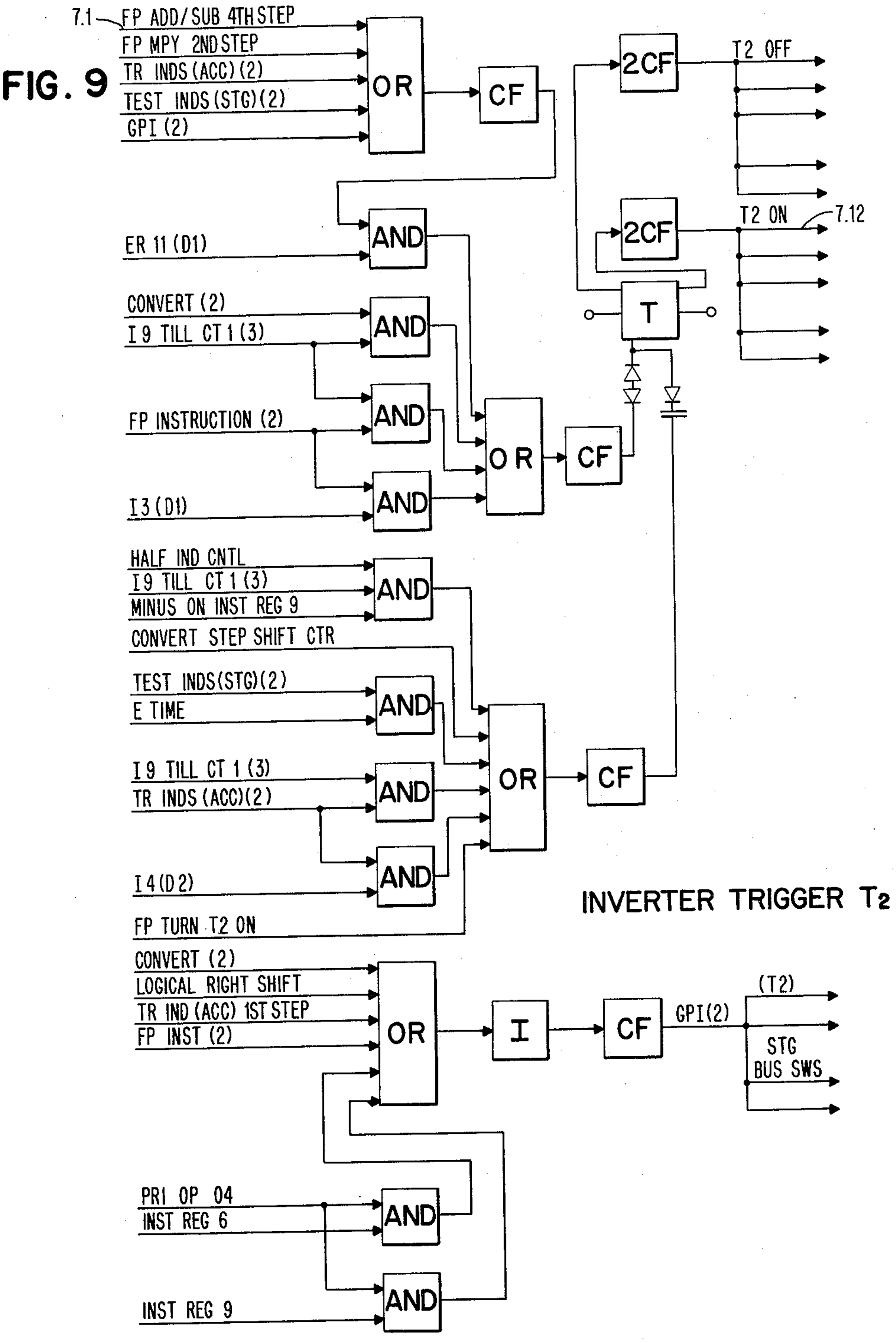

FIGURE 9 is a logical block diagram of the Inverter Trigger $T_2$ and associated circuits.

FIGURE 10 (2 sheets) is a logical block diagram of True Accumulator (Q, P, 1–8) to Adders; True Accumulator (9–35) to Adders.

Figure 11:
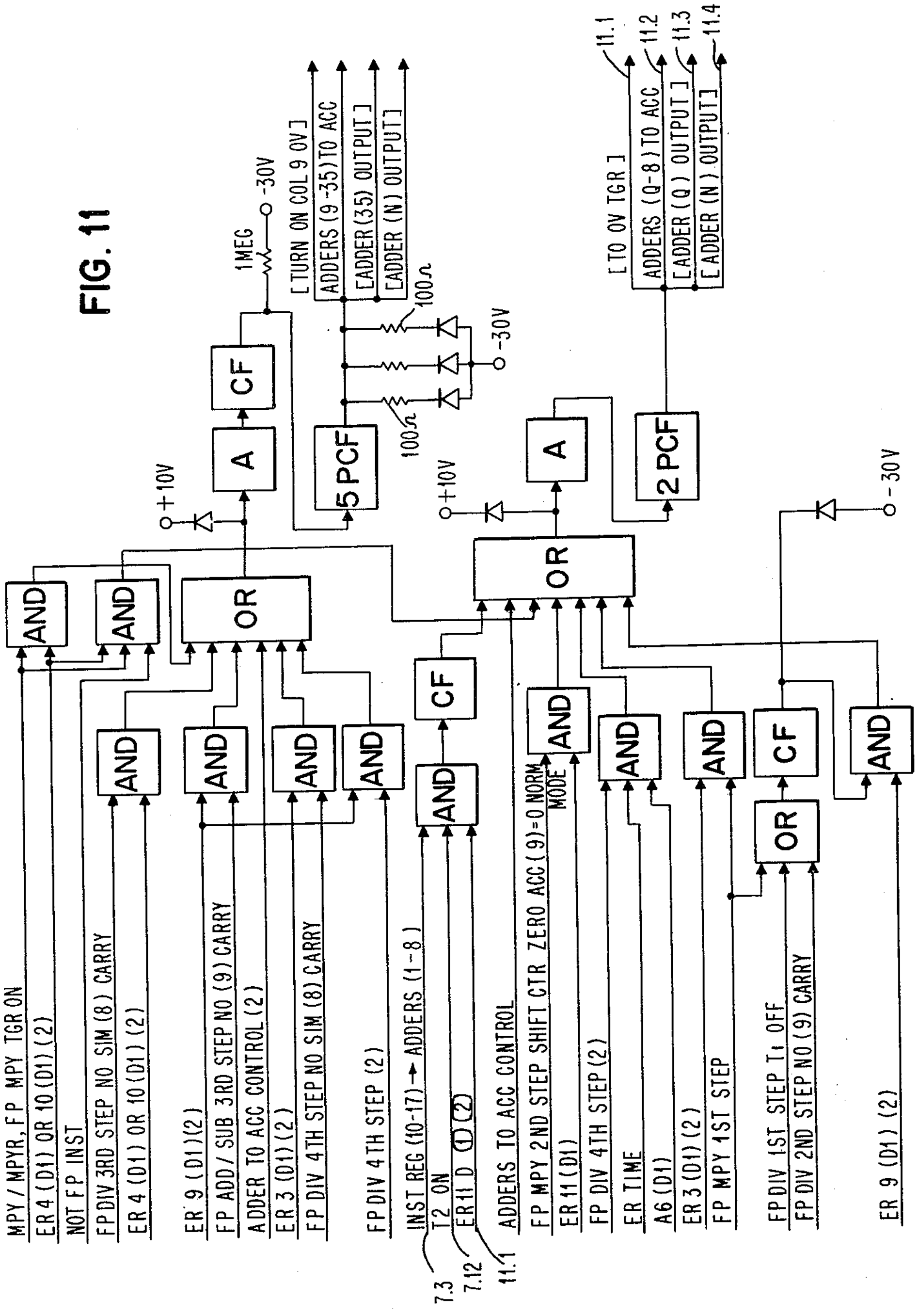
Figure 12:
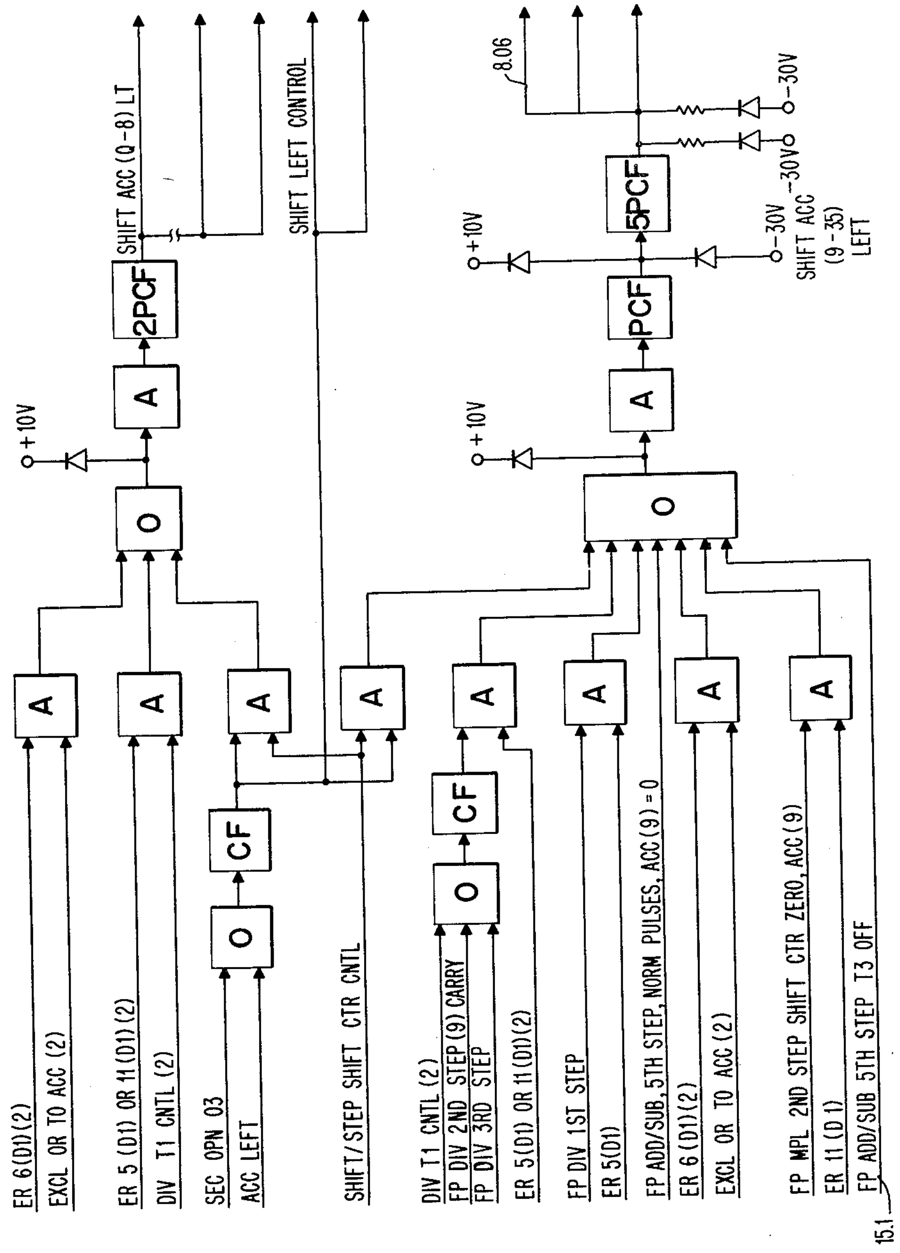

FIGURE 11 is a logical block diagram of Adder (Q, P, 1–8) to Accumulator; Adder (9–35) to Accumulator, FIGURE 12 is a logical block diagram of Shift Accumulator Left.

Figure 13:
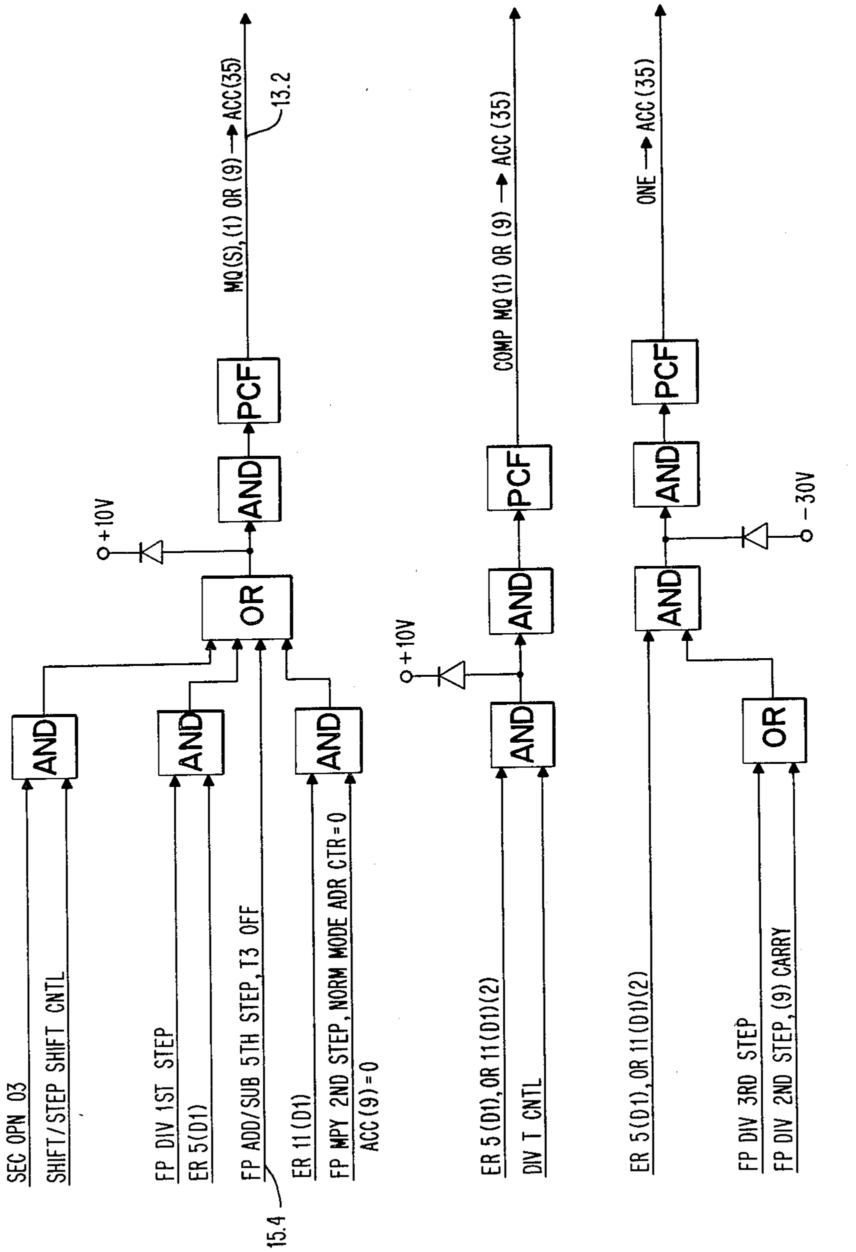

FIGURE 13 is a logical block diagram of MQ (S), (1) or (9) to Accumulator (35), 1 to Accumulator (35).

Figure 14:
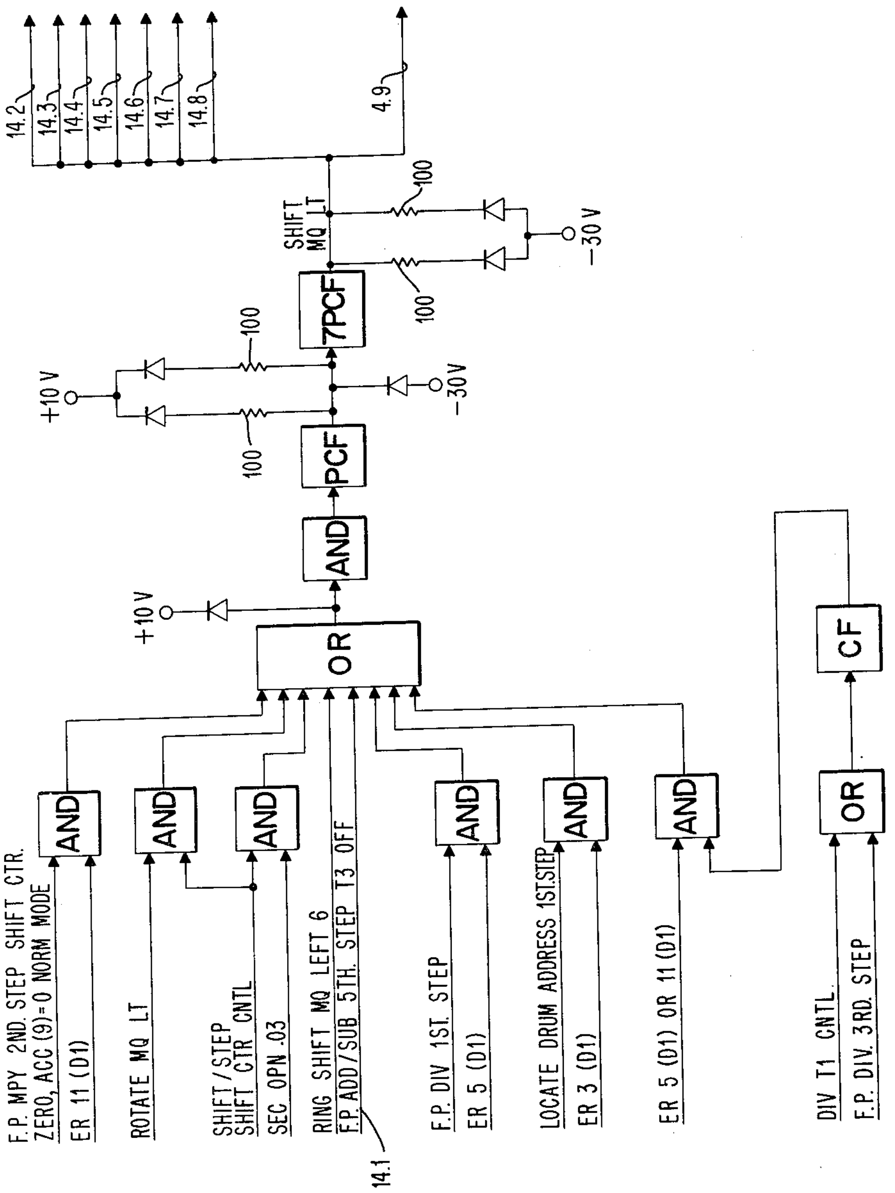

FIGURE 14 is a logical block diagram of Shift MQ Left.

Figure 15:
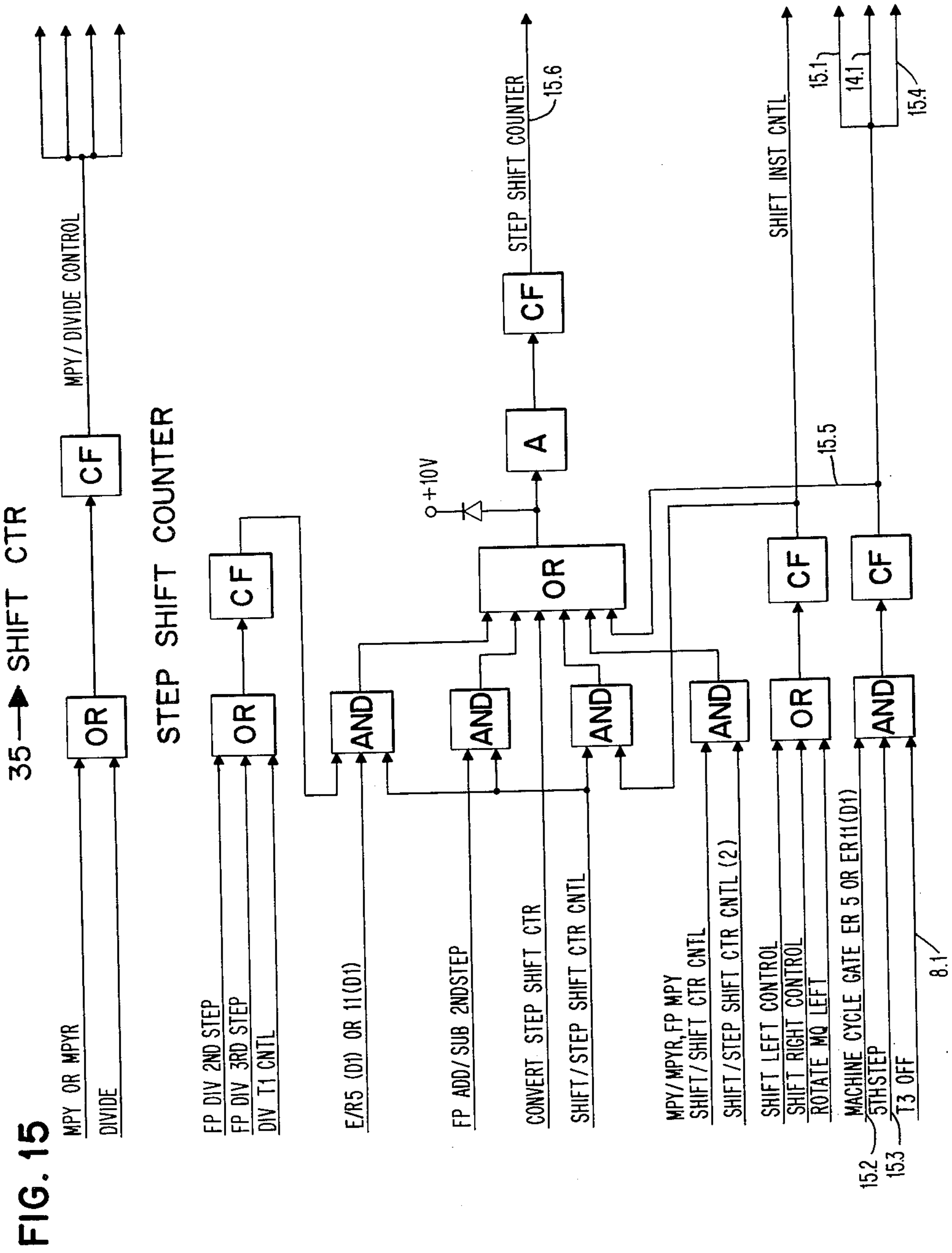

FIGURE 15 is a logical block diagram of 35 to Shift Counter.

Figure 16:
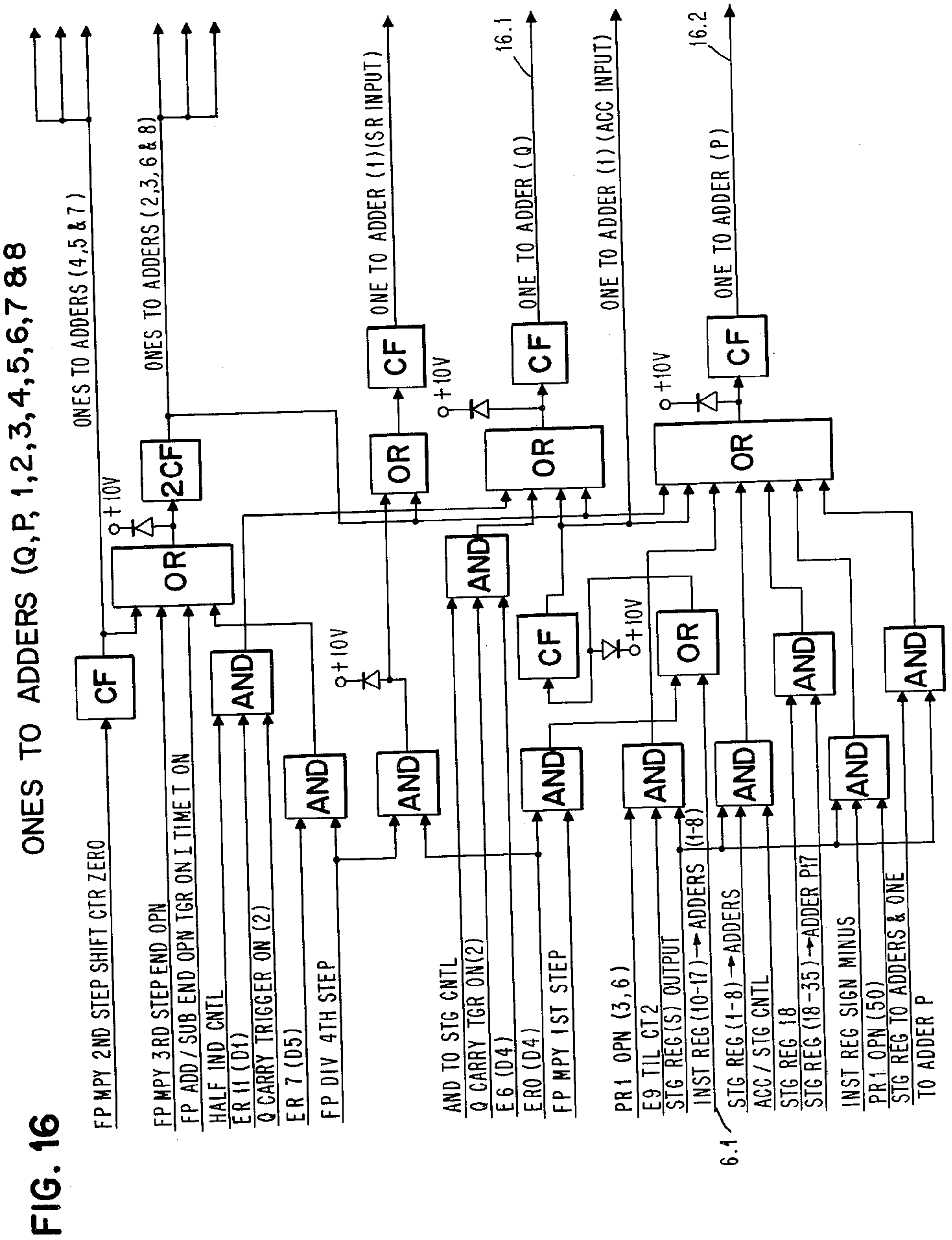

FIGURE 16 is a logical block diagram of Ones to Adders (Q, P, 1, 2, 3, 4, 5, 6, 7, & 8).

Figure 17:
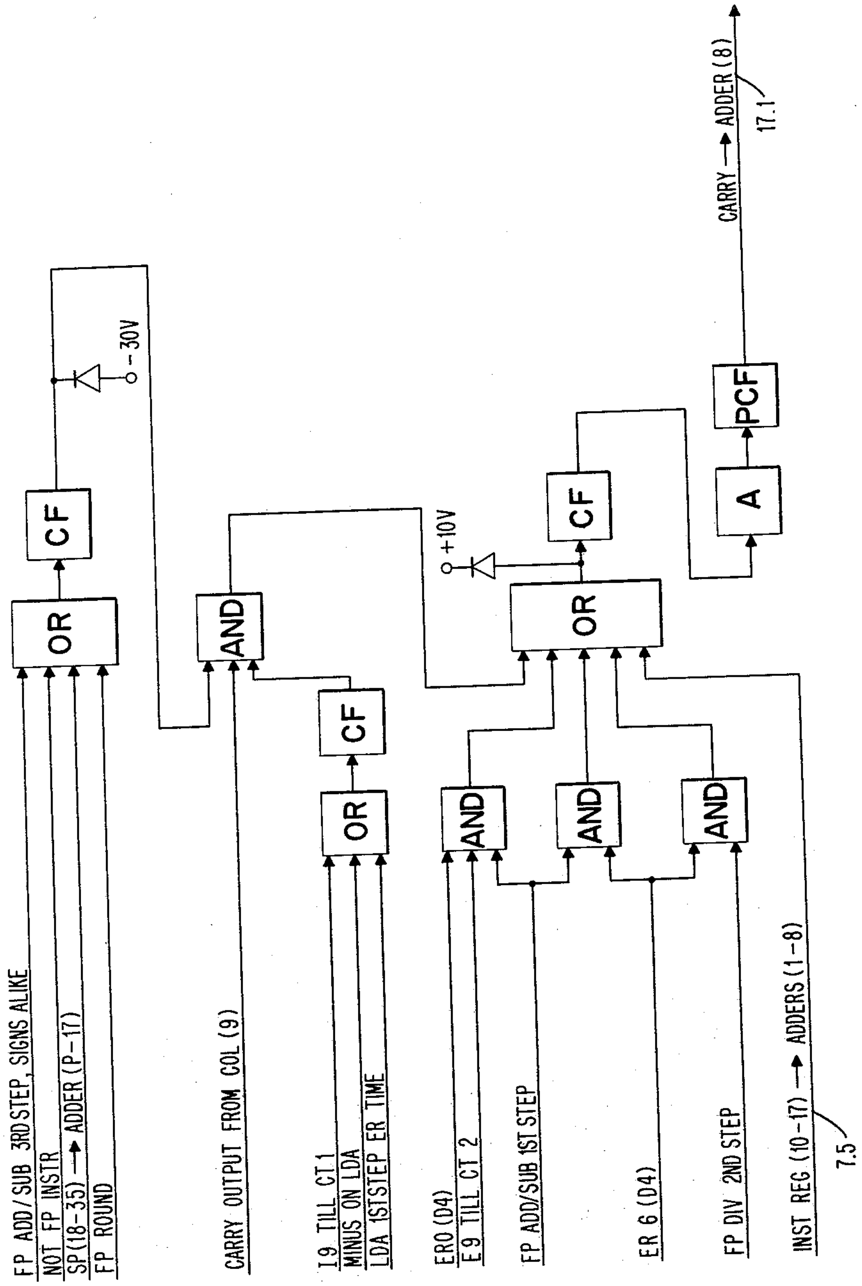

FIGURE 17 is a logical block diagram of Carry to Adder (8).

Figure 18:
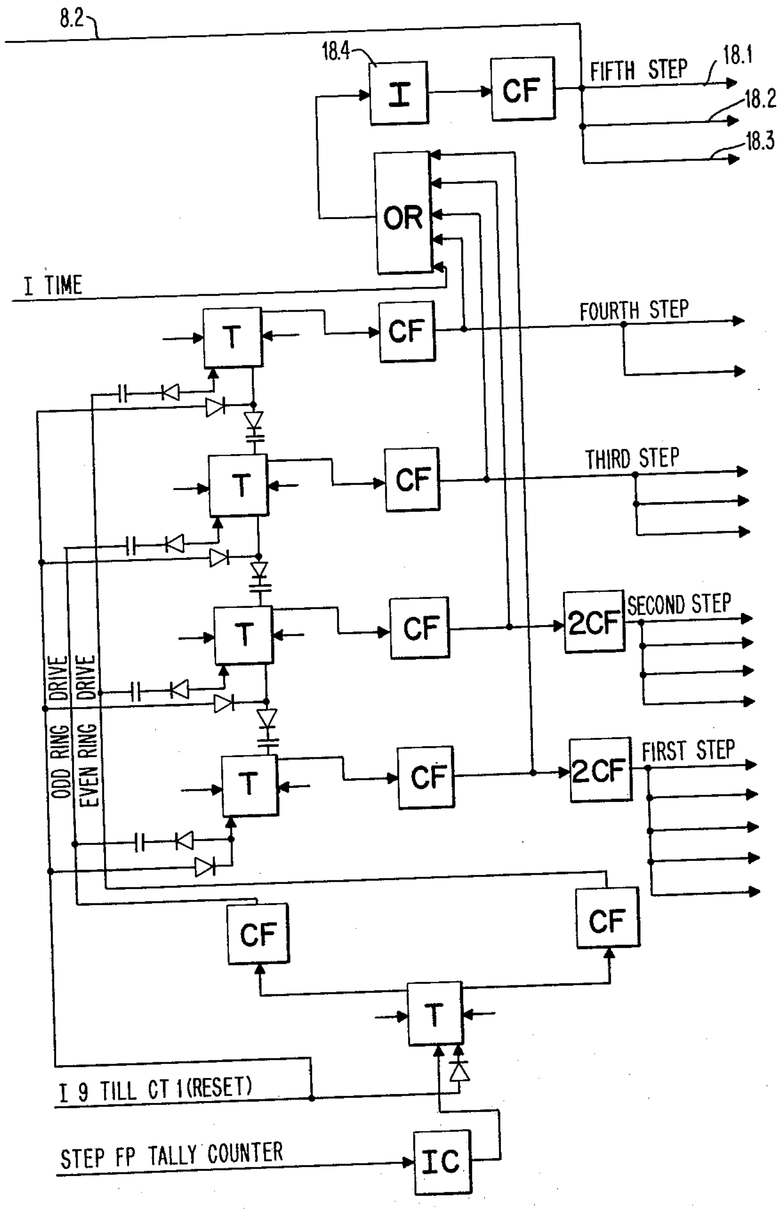

FIGURE 18 is a logical block diagram of the Floating Point Tally Counter.

Figure 19:
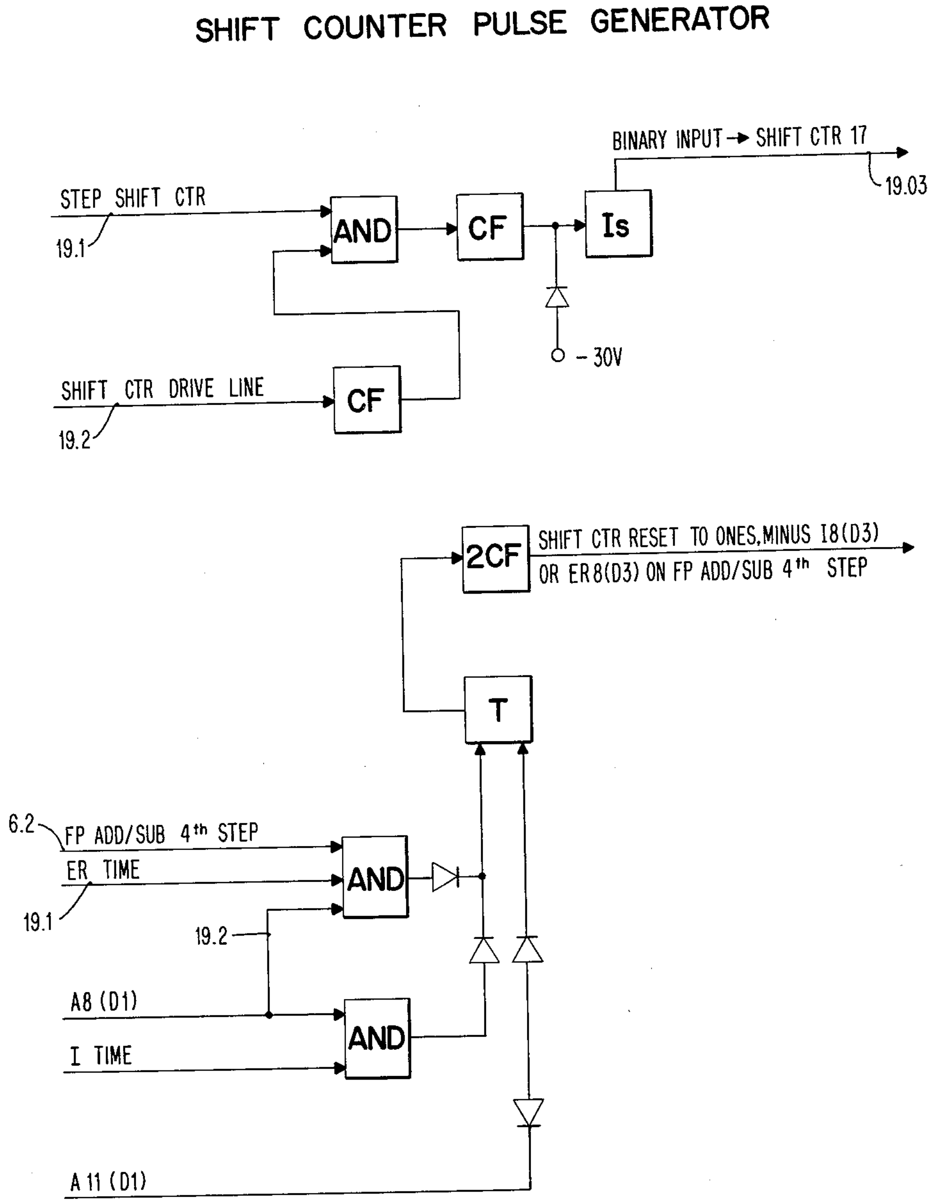

FIGURE 19 is a logical block diagram of the Shift Counter Pulse Generator.

Figure 20:
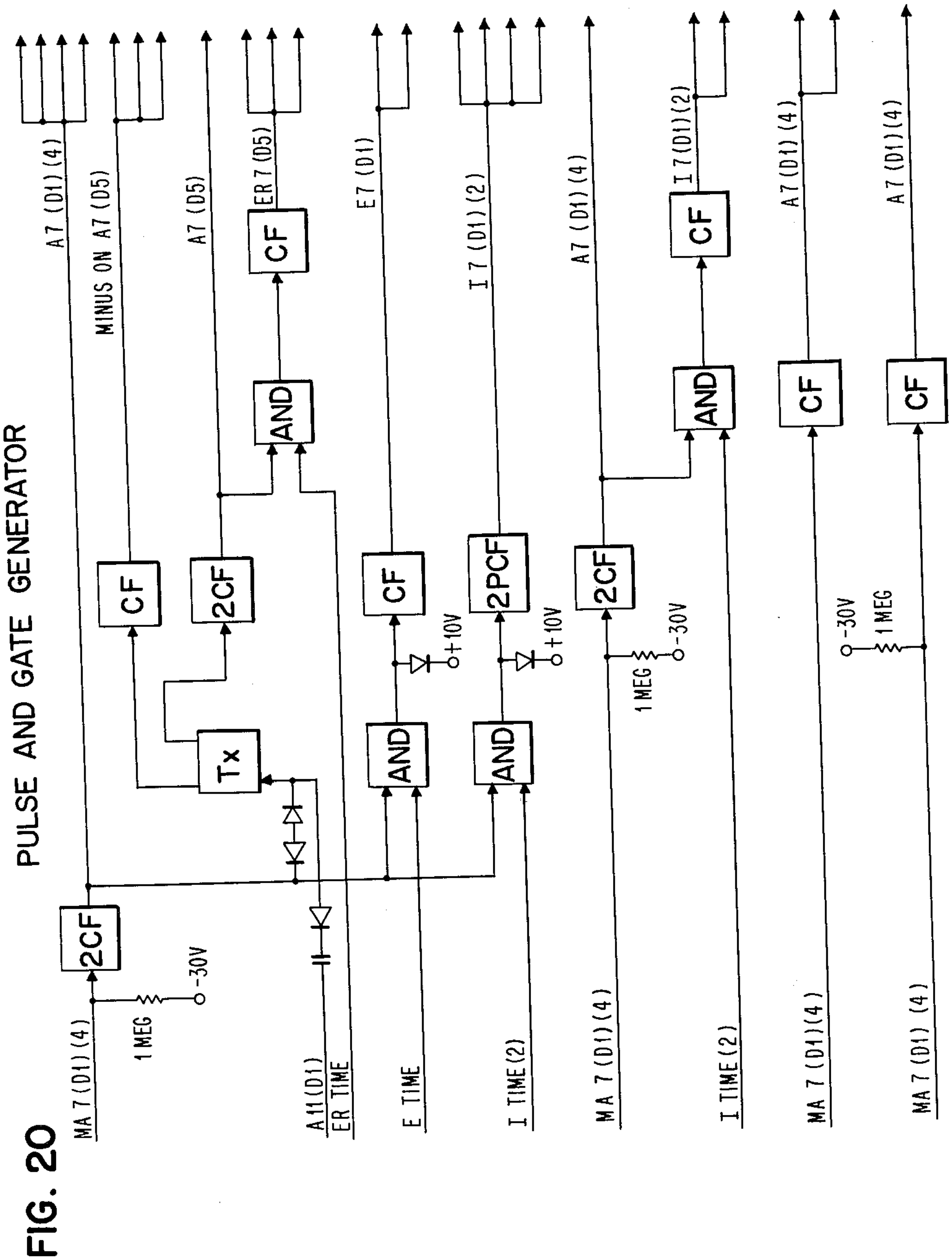

FIGURE 20 is a logical block diagram of the Pulse and Gate Generator.

Figure 21:
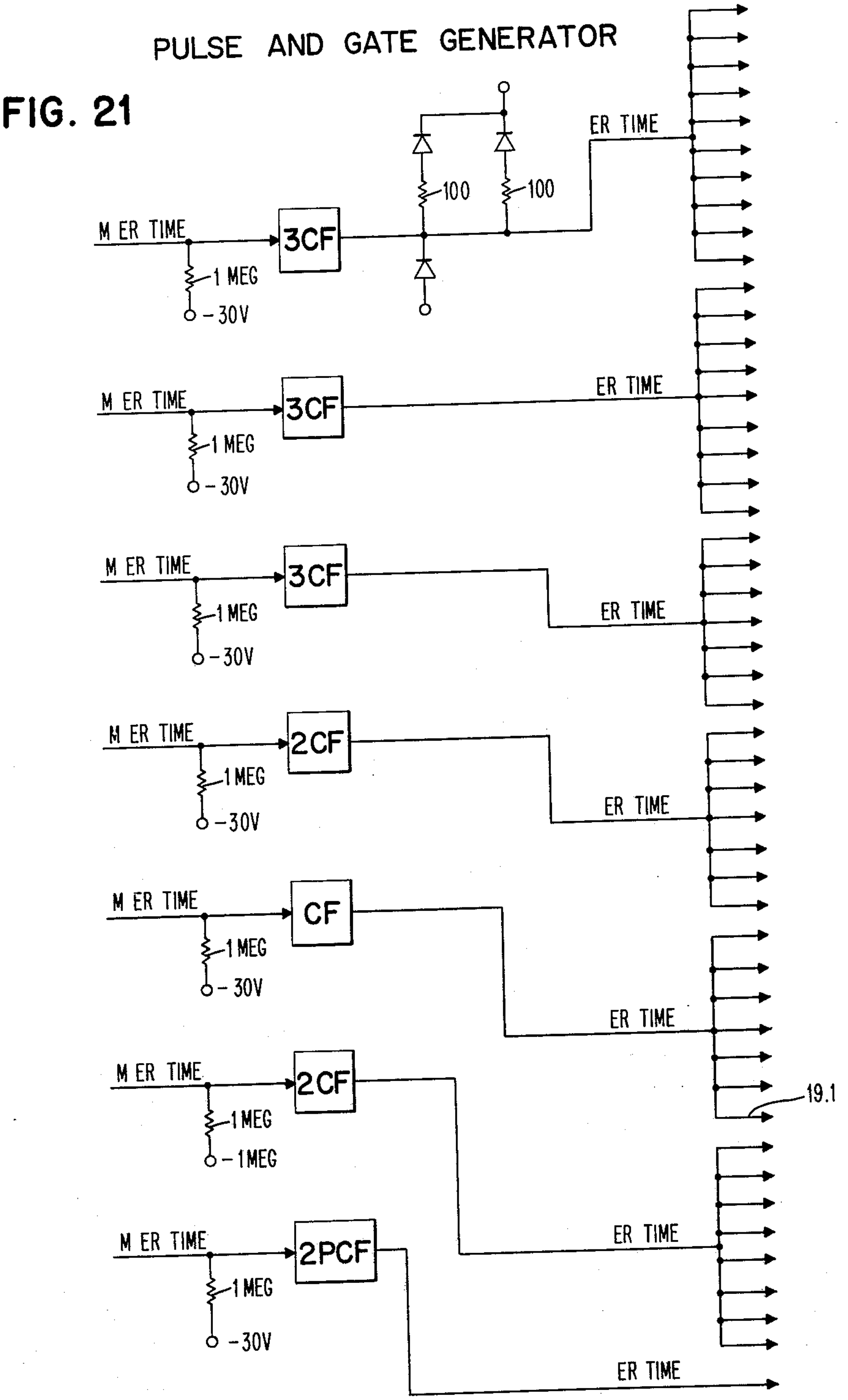

FIGURE 21 is another logical block diagram of the Pulse and Gate Generator.

Figure 22:
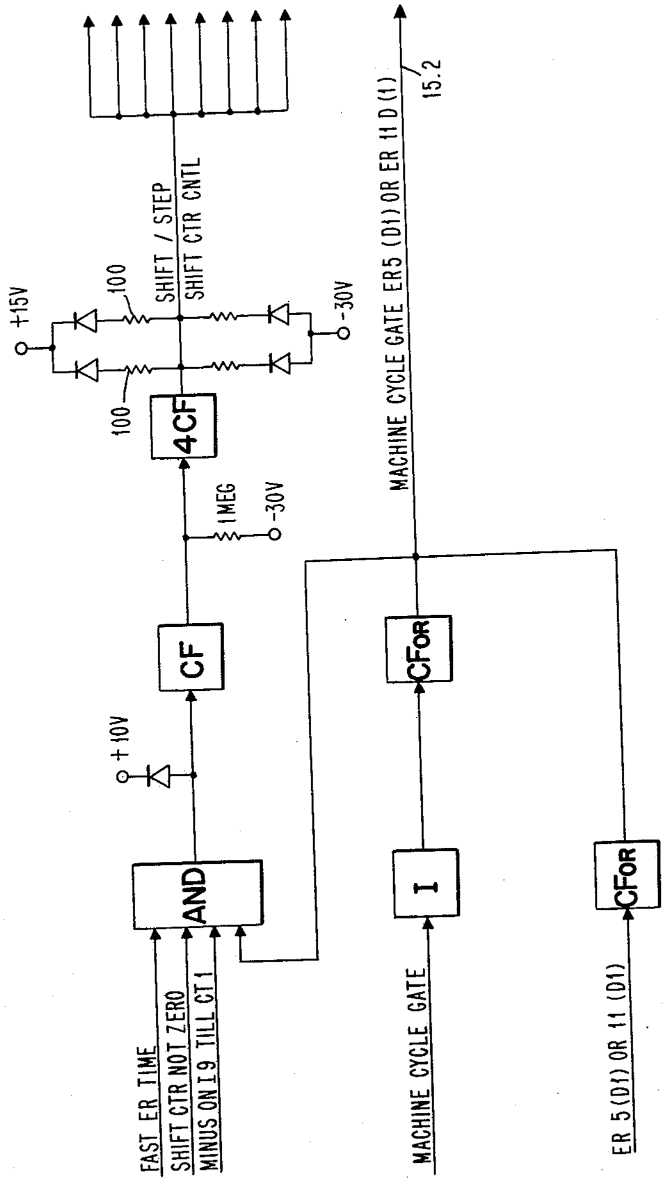

FIGURE 22 is still another logical block diagram of a Pulse and Gate Generator.

Figure 23:
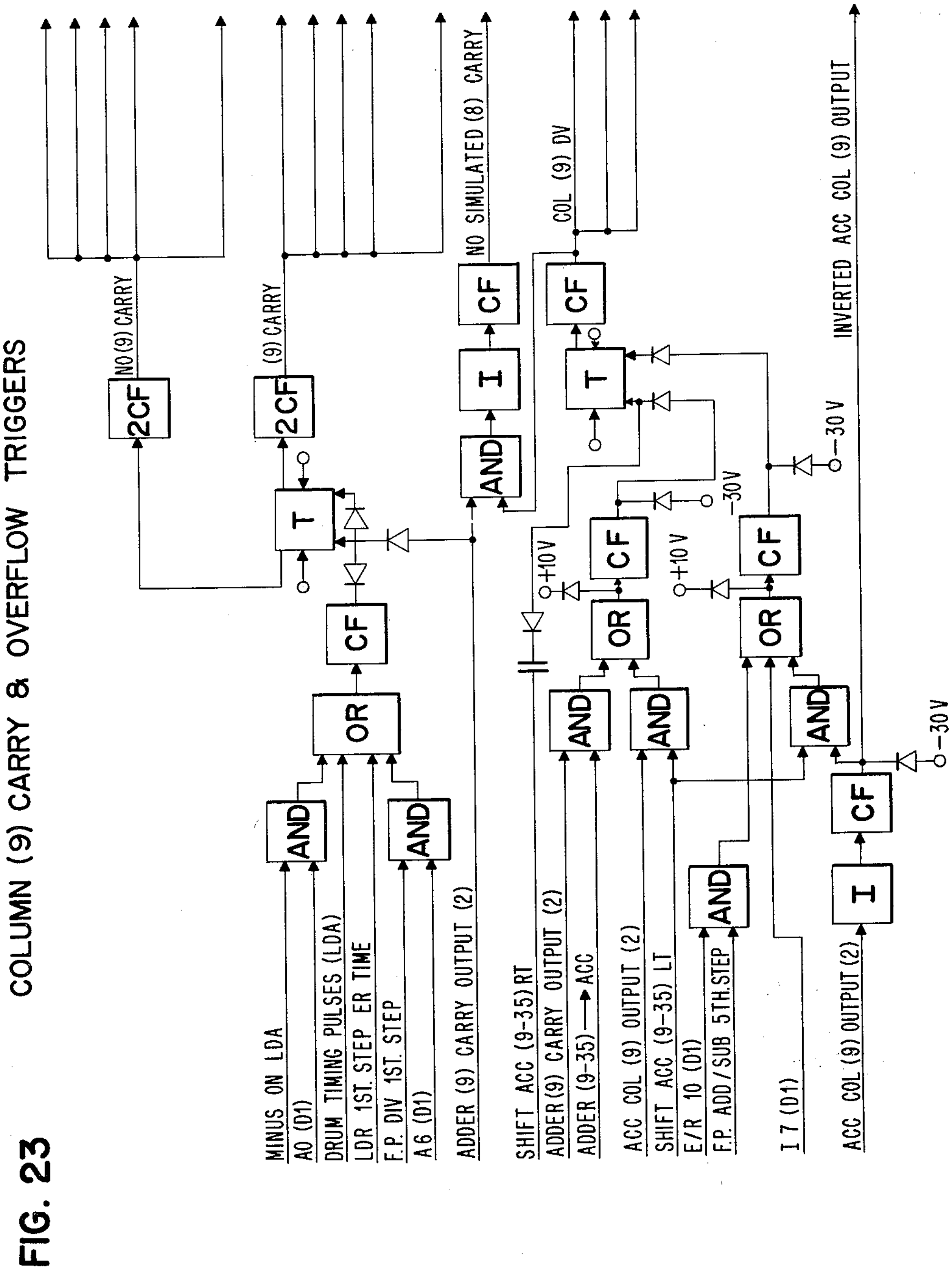

FIGURE 23 is a logical block diagram of Column (9) Carry & Overflow Triggers.

Figure 24:
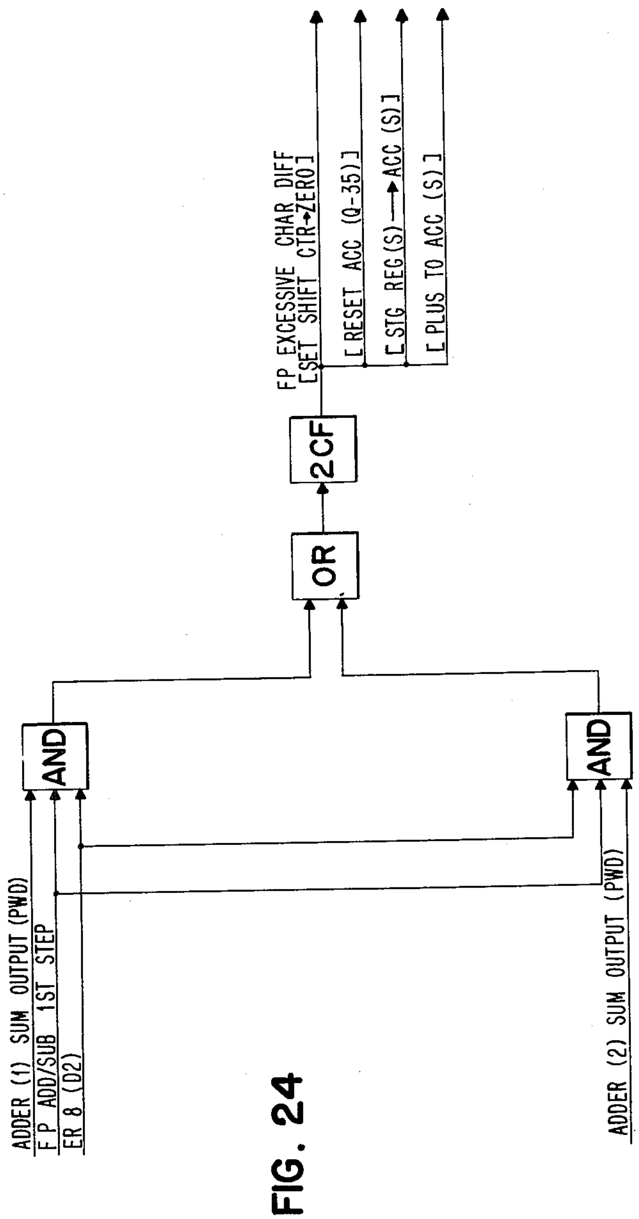

FIGURE 24 is a logical block diagram of FP Add/Sub. Char. Diff. Test.

Figure 1:
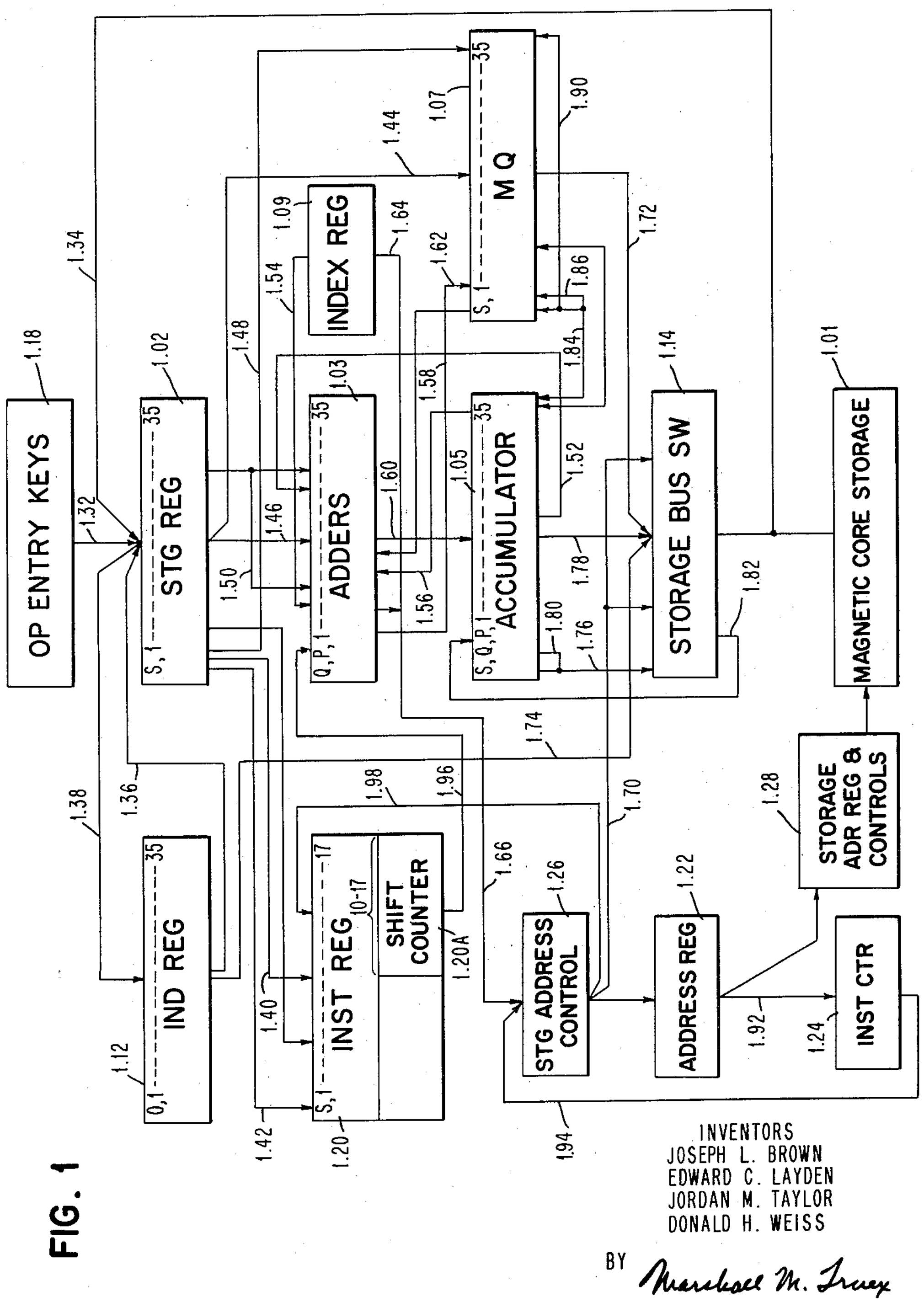
FIGURE 1 is a block diagram illustrating the Data Processing System of the present invention.

In FIGURE 1, there is shown a block diagram of a high speed Data Processing System which is controlled by an internally stored program of instructions of the single address type. The function of transferring data between the Central Processing Unit and Magnetic Core Storage is controlled by the stored program as well. The Data Processing System operates in the binary number system and many of the basic elements assume two stable states so that such elements are well suited to the binary system of notation where one specified state is indicative of a binary "one" and the other state is indicative of a binary "zero." The basic unit of information, the Word, consists of thirty-six binary digits (S, 1, 2 through 35) where S refers to the sign position, 1 refers to bit position 1, 2 refers to bit position 2 and so forth. Only when a word is interpreted as numerical data does position S have any algebraic significance. Then, with position S containing a "zero" the word is signified as positive and with position S containing a "one" the word is signified as negative. When a logical operation is performed upon a word, the word is interpreted as a thirty-six bit signless number.

Individual locations in Magnetic Core Storage 1.01 are identified by a system of numerical addresses, as described more fully in copending application, Serial No. 705,442, filed in December 26, 1957. By means of a number expressed in binary form in the Address part of the Instruction, it is possible to refer to the information contained in any location in Magnetic Core Storage.

In FIGURE 1, the Central Processing Unit has data portions which comprise a thirty-six order Storage Register 1.02 comprising thirty-five orders and a sign order, a thirty-six order Adder 1.03 plus one overflow order, an Accumulator Register 1.05 of thirty-five orders plus two overflow orders P and Q and a sign order S, a Multiplier Quotient Register 1.07 comprising thirty-five orders and a sign order, three Index Registers 1.09 A, B and C of fifteen orders and their associated Index Register controls, an Indicator Trigger Register 1.12 of thirty-six orders 0 through 35, Storage Bus Switching 1.14 of thirty-six orders connected to a Storage Bus 1.16 of thirty-six orders, the latter being connected to Magnetic Core Storage 1.01, and Operator's Entry Keys 1.18 of thirty-six orders. Associated with the data portion previously described is an Instruction Register 1.20 of eighteen positions S, 1 through 17 of which positions 10 through 17 are used selectively as a Shift Counter 1.20A, an Address Register 1.22, an Instruction Counter 1.24 with related Storage Address Controls 1.26, and a Storage Address Register and controls 1.28. Information may be placed in Core Storage from either the Accumulator Register 1.05, the Multiplier Quotient Register 1.07, or the Indicator Register 1.12. It is a function of the Storage Bus Switches 1.14 to switch the contents of the Accumulator Register, the MQ Register, or the Indicator Register onto the Storage Busses 1.16 in accordance with the execution of certain instructions which require that information be placed in Storage.

A detailed description of general operations of a computer of this class which may be performed in response to well-known instructions is found in copending application, Computer for 701, Serial No. 419,642, now Patent No. 2,974,866, Haddad et al., filed March 30, 1954, which is incorporated by reference herein. Certain arithmetic, logical and other operations may be performed by the device of the present invention in response to instructions tabulated immediately below in accordance with the principles set forth in the Manual of Operations, Electronic Data Processing Machines, Type 704, Form No. 24-6661, copyright 1954, 1955 and printed in the U.S.A. by International Business Machines Corporation, the assignee of this application.

| Title | Operation Code |
|---|---|
| Add and Carry Logical Word | ACL+0361. |
| Add | ADD+0400. |
| Add Magnitude | ADM+0401. |
| Accumulator Left Shift | ALS+0767. |
| AND to Accumulator | ANA−0320. |
| AND to Storage | ANS+0320. |
| Accumulator Right Shift | ARS+0771. |
| Backspace Tape | BST+0764. |
| Clear and Add Logical Word | CAL−0500. |
| Compare Accumulator with Storage | CAS+0340. |
| Change Sign | CHS+0760 . . . 0002. |
| Clear and Add | CLA+0500. |
| Clear Magnitude | CLM+0760 . . . 0000. |
| Clear and Subtract | CLS+0502. |
| Complement Magnitude | COM+0760 . . . 0006. |
| Divide Check Test | DCT+0760 . . . 0012. |
| Divide or Halt | DVH+0220. |
| Divide or Proceed | DVP+0221. |
| Enter Trapping Mode | ETM+0760 . . . 0007. |
| Floating Add | FAD+0300. |
| Floating Divide or Halt | FDH+0240. |
| Floating Divide or Proceed | FDP+0241. |
| Floating Multiply | FMP+0260. |
| Floating Subtract | FSB+0302. |
| Halt and Proceed | HPR+0420. |
| Halt and Transfer | HTR+0000. |
| Low Order Bit Test | LBT+0760 . . . 0001. |
| Locate Drum Address | LDA+0460. |
| Load MQ | LDQ+0560. |
| Logical Left | LGL−0763. |
| Long Left Shift | LLS+0763. |
| Long Right Shift | LRS+0765. |
| Leave Trapping Mode | LTM−0760 . . . 0007. |
| Load Index from Address | LXA+0534. |
| Load Index from Decrement | LXD−0534. |
| Multiply and Round | MPR−0200. |
| Multiply | MPY+0200. |
| Minus Sense | MSE−0760. |
| No Operation | NOP+0761. |
| OR to Accumulator | ORA−0501. |
| OR to Storage | ORS−0602. |
| Place Address to Index | PAX+0734. |
| P-Bit Test | PBT−0760 . . . 0001. |
| Place Decrement in Index | PDX−0734. |
| Plus Sense | PSE+0760. |
| Place Index in Decrement | PXD−0754. |
| Read Select | RDS+0762. |
| Rewind | REW+0772. |
| Round | RND+0760 . . . 0010. |
| Rotate MQ Left | RQL−0773. |
| Subtract Magnitude | SBM−0400. |
| Store Left Half MQ | SLQ−0620. |
| Store Logical Word | SLW+0602. |
| Set Sign Minus | SSM−0760 . . . 0003. |
| Set Sign Plus | SSP+0760 . . . 0003. |
| Store Address | STA+0621. |
| Store Decrement | STD+0622. |
| Store | STO+0601. |
| Store Prefix | STP+0630. |
| Store MQ | STQ−0600. |
| Subtract | SUB+0420. |
| Store Index in Decrement | SXD−0634. |
| Transfer on Index | TIX+2000. |
| Transfer on Low MQ | TLQ+0040. |
| Transfer on Minus | TMI−0120. |
| Transfer on No Overflow | TNO−0140. |
| Transfer on No Index | TNX−2000. |
| Transfer on No Zero | TNZ−0100. |
| Transfer on Overflow | TOV+0140. |
| Transfer on Plus | TPL+0120. |
| Transfer on MQ Plus | TQP+0162. |
| Transfer | TRA+0020. |
| Transfer and Set Index | TSX+0074. |
| Trap Transfer | TTR+0021. |
| Transfer on Index High | TXH+3000. |
| Transfer with Index Incremented | TXI+1000. |
| Transfer on Index Low or Equal | TXL−3000. |
| Transfer on Zero | TZE+0100. |
| Unnormalized Floating Add | UFA−0300. |
| Unnormalized Floating Multiply | UFM−0260. |
| Unnormalized Floating Subtract | UFS−0302. |
| Write End of File | WEF+0770. |
| Write Select | WRS+0766. |

Still other instructions not described in this application cause operations to be performed in accordance with the principles described in copending applications, Serial No. 705,447, filed December 26, 1957; Serial No. 705,445, filed December 26, 1957; Serial No. 705,446, filed December 26, 1957; Serial No. 705,444, filed December 26, 1957; and Serial No. 705,442, filed December 26, 1957, which are also incorporated by reference to form a part of this application.

For ease of description, many references will be made to numbers expressed in the octal notation indicated by the subscript 8 as opposed to the decimal notation indicated by the subscript 10. For example, the $(206)_8$ equals 010000110 as does $(134)_{10}$ expressed in binary form. The octal notation is convenient because conversion of a binary number is accomplished by letting each group of three binary bits represent a decimal number:

| 2 | 0 | 6 |
|---|---|---|
| 010 | 000 | 110 |

Obviously, the decimal equivalent is $(134)_{10}=2^7+2^2+2^1 =128+4+2$

In the computer, a whole number is expressed as a binary fraction and a power of 2. The power, or exponent, can be plus or minus, as well as the sign of the fraction, and since only one sign control circuit exists in the computer, one of the signs is implied. To do this $128_{10}$ or $200_8$ is added to the exponent of 2. The sum is designated the characteristic to distinguish it from the exponent and is contained in positions 1 through 8 of the thirty-six bit word (S, 1 through 35). Positions 9 through 35 contain the binary fraction and position S designates the sign of the fraction. Using the constant $200_8$ permits the exponent to vary from $-200_8$ to $+177_8$ and the characteristic to vary from 0 to $377_8$. The computer can then operate on floating point numbers representing the decimal numbers of $10^{+35}$ through $10^{-38}$ without exceeding the limits of the characteristic.

EXAMPLES OF FLOATING POINT NUMBERS

*Example 1*

$-1$ may be written in the form $-1/2\times2^{+1}$ and adapted to a 36 bit word becomes:

| Characteristic | Fraction |
|---|---|
| S, 1 8<br>− 10000001 | 9 35<br>10000..........0 |

*Example 2*

$+1/8$ may be written in the form $+1/2\times2^{-2}$ and adapted to the 36 bit word becomes:

| Characteristic | Fraction |
|---|---|
| S, 1 8<br>+ 01111110 | 9 35<br>10000..........00 |

*Example 3*

$+1/8$ may also be written in the form of $+1/8\times2^{0}$ and adapted to the 36 bit word becomes:

| Characteristic | Fraction |
|---|---|
| S, 1 8<br>+ 10000000 | 9, 10, 11 35<br>0 0 1 000.........00 |

Example 1 illustrates the floating point representation of a number having a negative fraction and a positive exponent. Example 2 illustrates how the floating-point representation of a number with a negative exponent accounts for the sign by subtracting the exponent from $200_8$ to develop the characteristic. Example 3 indicates an alternate floating point representation.

Normalized fractions like Examples 1 and 2 contain a "1" bit in position 9 of the word; therefore, they will always have an octal value greater than or equal to 0.4 or a decimal value greater than or equal to 0.5. A fraction such as the 1 of Example 3 is said to be unnormalized. It can be normalized by shifting the fraction to the left until the first "1" bit is placed in position 9. For each shift, the characteristic must be reduced by one, as explained previously, so that the final value of the representation is unchanged.

PROGRAM CIRCUITS

The information received from Core Storage 1.01 by the Central Processing Unit is initially placed in the Storage Register 1.02 prior to being operated on by the Program and Arithmetic circuits. The registers and counters used to receive and decode the instructions consist of the Instruction Register 1.20, the Instruction Counter 1.24 and related control circuits. The Storage Address Register 1.28 holds the address to which reference is made in Core Storage. Each of the Registers and counters is discussed individually with reference to its function in the overall flow of information.

The input information control which governs the execution of the operation to be performed is primarily the output of the Instruction Register 1.20 which includes an Operation Decoder. The decoder output is often mixed with one of the following conditions to provide conditional operation: (1) whether an overflow has occurred in the Accumulator, (2) whether the carry output from column Q of the adder is present, (3) whether the carry output from Column 6 of the adder is present, (4) whether the contents of the sign position of the Accumulator Register, the Storage Register and the Quotient Register is negative, or (5) whether the Shift Counter is at "0" or not. The Shift Counter is used to count cycles for multiply or divide instructions and is also used to count the number of shifts in shifting instructions such as those involving normalizing. The command circuits are also provided with pulses or gates which become the output command lines or control lines when they are conditioned by the outputs of the execution controls.

The Storage Register 1.02 has inputs 1.32 to each of its positions S, 1 through 35 from respective ones of positions S, 1 through 35 of the Entry Keys 1.18. The Storage Register also has inputs 1.34 to positions 1 through 35 from corresponding outputs of positions 1 through 35 of Storage Bus Switching 1.14. Another set of inputs 1.36 is provided to the Storage Register positions S, 1 through 35 from the outputs of the Indicator Register 1.12 positions O, 1 through 35. Outputs 1.38 are provided from Storage Register positions S, 1 through 35 to the input of positions O, 1 through 35 of the Indicator Register. Outputs 1.40 from Storage Register positions 3 through 11 are provided to positions 1 through 9 of the Instruction Register. Furthermore, an additional pair of outputs 1.42 from Storage Register positions 1 and 2 are sent to the inputs of the Instruction Register positions 8 and 9. Outputs 1.44 from Storage Register positions S and 1 through 35 are provided to respective positions S, 1 through 35 of the MQ Register. Outputs 1.46 are provided from positions 1 through 35 of the Storage Register to respective inputs 1 through 35 of the Adders. Outputs 1.48 from positions S, 1 through 5 of the Storage Register, are provided to the inputs of positions 30 through 35 of the MQ Register 1.07. Outputs 1.50 from positions 20 through 35 of the Storage Register are provided to the inputs of positions 1 through 17 of the Adder.

The Adders 1.03 have positions Q, P and 1 through 35, as previously described, and inputs are provided to positions Q, P and 1 through 35 of the Adders from positions Q, P and 1 through 35 outputs of the Accumulator Register. Inputs 1.54 are provided to positions 3 through 17 of the Adder from positions 3 through 17 of the Index Registers. Inputs 1.56 are provided to positions 12 through 17 of the Adder, from positions 30 through 35 of the Accumulator Register, and inputs 1.58 are provided to positions 12 through 17 of the Adder from positions 1 through 5 of the MQ Register. Outputs 1.60 are provided from the Adder as inputs to positions Q, P and 1 through 35 of the Accumulator Register. Outputs 1.62 are provided from the Adder positions 1 through 8 to the input of positions 1 through 8 of the MQ Register. Outputs 1.64 are provided from the Adder positions 3 through 17 to the inputs of each of the Index Registers 1.09 and outputs 1.66 are provided from the Adder positions 3 through 17 to the inputs of the Storage Address Register 1.28 via the Storage Address Control 1.26.

A carry output is provided from each lower order Adder position to each higher order position. For example, the carry output of position 34 of the Adder is connected to the input of position 33 of the Adder, the carry output of position 33 of the Adder is connected to the input of position 32 of the Adder, and in like manner similar carry lines are connected through position Q.

Output lines 1.70 are provided from positions 3 through 17 of the Storage Address Controls 1.26 as inputs to positions 3 through 17 of the Storage Bus Switches.

Inputs 1.72 are provided to the Storage Bus Switching positions S, 1 through 35 from the output of the MQ Register positions S, 1 through 35 and inputs 1.74 are provided to Storage Bus Switching positions S, 1 through 35 from the outputs of the Indicator Register. An input 1.76 is provided to position S of Storage Bus Switching from the output of position P of the Accumulator Register. Inputs 1.78 are provided to the Storage Bus Switching positions 1 through 35 from positions 1 through 35 of the Accumulator Register, and there is a connection 1.80 between the output of position P of the Accumulator Register to the input of the S position of the Storage Bus Switching.

Outputs 1.82 are provided from Storage Bus Switching positions S, 1 through 5 to positions P, 1 through 5 of the Accumulator Register. Positions P, 1 through 35 of the Accumulator Register have outputs from each lower order position connected to the next adjacent higher order position terminating at the input of position P for the purpose of shifting left. There are outputs from positions Q, P, 1 through 34 of the Adders to the inputs of the next adjacent lower order position terminating with the output position 34 entering as an input of position 35 for shifting right. Position 9 of the Accumulator Register has two output lines to a Column 9 Carry and Overflow Trigger and to Floating Point Add/Subtract Execution controls. An output 1.84 from position 35 of the Accumulator Register is connected to the input of position S of the Multiplier Register, and another output 1.86 is connected to position 1 of the MQ.

Position S of the MQ Register has an output line to Adder and True Complement Controls, an output to Floating Point Shift Counter and another output to Sign Mixing. Position 1 of the MQ Register has an output to Floating Point Shift Control, an output to Multiply Execution Control and an output to Sense Unit Address. Position 8 of the MQ Register has an output to Floating Point Shift Control, and position 9 has an output to the Floating Point Shift Control and an output that goes to Floating Point Round. The output of each lower order position of the MQ Register is connected as an input to the next higher order position. For example, the output to position 35 is connected to the input of position 34 and so forth in like manner until the final connection is made 1.90 between the output of position 35 and the input of position S of the MQ Register for left shifting. Furthermore, outputs are provided from each higher order position of the MQ Register to each adjacent lower order position beginning with the output of position S to the input of position 1 and ending in like manner with connections from the final one of the outputs to the input of position 35. A single input is supplied to position 35 of the MQ Register from One to MQ Register.

Output lines 1.92 are provided from positions 3 through 17 of the Address Register to positions 3 through 17 of the Instruction Counter and outputs 1.94 are provided from positions 3 through 17 of the Instruction Counter as inputs to positions 3 through 17 of the Address Register. Positions 10 through 17 of the Shift Counter 1.20A are coupled by means of 1.96 to positions 1 through 8 of the Adders.

MACHINE TIMING

The fundamental machine cycle of the Data Processing System is 12 microseconds. One cycle is the duration of Core Storage access time which is the time required by the Central Processing Unit to transmit or receive a word of information to or from Core Storage. The fundamental machine cycles may be Instruction (I) cycles, Execution (E) cycles, Execute-Route (E/R) cycles and Buffer (B) cycles, each of 12 microseconds duration. I cycles are required to make references to Memory to get Instructions from Core Storage and distinguish instruction words from data words. Execution (E) cycles are required for the Central Processing Unit to make reference to Storage in order to obtain words therefrom and place words therein. E/R cycles are taken by the CPU for operations *without* references to Memory.

The timing circuits comprise an oscillator which oscillates at a frequency of 1 megacycle and provides signals to an Inverted Sync Generator. The Inverted Sync Generator provides inverted sync pulses on one output and pulses on another output to an Inverted Clamp Generator and Clock Drive, the latter having 2 outputs, an inverted clamp line and a drive line to the Clock. The Clock provides the master timing pulses, labelled Master A0 through A11 by subdividing the period of the 1 megacycle oscillator by 12 using a ring of 12 triggers in a manner well known in the art. The signals on the Inverted Clamp line and the Inverted Sync line are special signals required by the Microsecond Delay Units in the Storage Register, Accumulator Register and MQ Register. The Inverted Synchronizing pulse is a positive pulse having a duration of approximately 0.3 of a microsecond, and the Clamp pulse is a negative pulse having a duration of approximately .02 microseconds. Both pulses occur at the megacycle rate of the Oscillator and are in phase with each other which is necessary for proper operation of the Microsecond Delay Units as described hereafter. Cycle Timer Output circuits provide outputs indicative of the type of cycle that the machine is to take, that is, whether the cycle shall be an Instruction (I) cycle, Execution (E) cycle or Execute-Route (E/R) cycle and one and only one of the outputs indicative of I, E or E/R time is up at any time. Each output stays up for a minimum duration of one 12 microsecond cycle. Cycle Timer controls provide instructions to the Cycle Timer Output circuits of Go to E Time, Go to E/R Time and Go to I Time.

The Cycle Timer follows this sequence: During the last machine cycle pertaining to a previous instruction, a signal is sent to the Cycle Timer indicating that the instruction is complete and that the Central Processing Unit is to proceed to I time for the purpose of going to Core Storage for the next instruction according to usual stored program techniques. When this has been accomplished, at Lead-In Instruction time (around 10 time in I time) the new instruction is decoded. Immediately following the decoding of this instruction, the type of instruction is known as well as whether or not another reference to Core Storage is required. For instance, if the instruction is Add, this requires another reference to Storage to bring in the data for the addition. Therefore, the Central Processing Unit is told to make its next machine cycle an E cycle which provides a reference to memory. In case of a Store instruction, the same would apply except that this time the references to Memory would cause information to be moved from a register in the Central Processing Unit to Core Storage. During execution of some instructions, references to Memory may not be required. In the case of multiply, which does not require more than the initial reference to memory to get the multiplicand after which a series of E/R cycles are required in order to actually do the iterative addition and shifting as required by the Central Processing Unit in order to perform the multiplication.

INSTRUCTION COUNTER

The Instruction Counter 1.24 determines the address to which reference is made during an Instruction cycle. In the normal process of the program, sequential addresses in storage are interrogated during successive I times because the counter normally receives a pulse at the end of each operation to count up 1 so that a succeeding numbered address is referred to on the next Instruction cycle. The loading of the Instruction Counter occurs at the beginning of each Instruction cycle and determines the address of the word to be used as the next Instruction *except* in those I times following a Halt, a successful Transfer or Branch and in certain operations such as Skip which advances the Instruction Counter more than 1 to cause skipping of instruction.

INSTRUCTION REGISTER

The Instruction Register stores and operates on the information normally received from Magnetic Core Storage as a result of an Instruction cycle until the instruction is completely executed when it is reset during the early part of the next Instruction cycle prior to receiving a new instruction. At every I8 time of the Instruction cycle, a one microsecond pulse (abbreviated D1) causes positions S, 1 through 9 of the Instruction Register to be reset at 0 and at the same time positions 10 through 17, the Shift Counter of the Instruction Register, are reset to 1. The layout of the Instruction Register is as follows: Sign position S; primary operation, positions 1 through 5; secondary operation, positions 6 through 9; and advance or shift counter data, positions 10 through 17. The information read from the Storage Register into the Instruction Register includes the sign, the primary operation part, secondary operation part of the Control Word, and positions 10 through 17 of the Instruction Register may receive information from the Address Register via a path 1.98.

ADDRESS PART OF THE INSTRUCTION REGISTER (SHIFT COUNTER)

The 8 positions 10 through 17 of the Instruction Register form a count-down counter of eight triggers which has a capacity of 255 places. This counter is reset to ones every I8 (D3) and on a Shift instruction the number of places to be shifted is placed in the Shift Counter by turning OFF the appropriate triggers at I12 time. Then the Shift Counter is impulsed every microsecond under a machine cycle gate and as the counter goes to 0, it signals the end of the shifting operation.

COMPONENT CIRCUITS

A detailed description of the principles of operation of a Magnetic Core Storage device may be had in Docket 5087, application Serial No. 592,545, now Patent No. 2,960,683, filed July 6, 1956, and referred to previously. A detailed description of a Central Processing Unit of the parallel binary type is described in Computer for 701, copending application Serial No. 419,642, now Patent No. 2,974,866, Philip E. Fox, filed March 30, 1954, and includes basic instructions and typical circuits for causing their performance. Especially applicable are FIGURES 1*b*, 1*d*, 1*f* and 1*g*, which correspond generally to devices employed in the present invention. Further description may be had with reference to similar arithmetic elements in "IBM" Type 701 Computer, by H. D. Ross, Proceedings of the I.R.E., vol. 41, pages 1287–1294, October 1953.

The Storage Register, Accumulator Register and Multiplier Quotient Register are composed of microsecond delay units which are storage units having the particular capacity of being able to accept information and transmit information at the same time. These units are described in detail in U.S. Patent Re. 23,699. The Adder and True Complement controls comprise thirty-five full Adders and two half Adders of the type explained in detail with reference to FIGURES 7*b* and 7*c* of application Serial No. 419,642 referred to previously. The True Complement controls are those circuits that control the input to the Adders and consist of switching circuits and inverters. The switches control the time and entry of a word into the Adder and also determine whether the digits pass through the Inverter or not. Thus, a word entered into the Adders may be either true or complement. The Indicator Register is composed of triggers of the bistable multivibrator type which remain in one or the other of two stable states until forced by external signals to assume the other state. The trigger is said to be ON when its left side if conducting, and, therefore, its left side is called the "ON side" and the right side is the "OFF side." In this instance, a trigger is said to be storing a "1" when ON and a "0" when OFF. In this embodiment of the invention, circuits are arranged to operate at voltage levels at a −30 volts and a +10 volts. When a line is referred to as being in the *Down* condition, it is assumed that the line is at a −30 volts, and conversely when a line is said to be in the *Up* condition it is to be assumed that the line is at a +10 volts potential.

Circuits employed in the practice of this invention have been designated to function in a one microsecond period which has been the usual period employed in similar machines by the Assignee of this application since the Type 701 Computer was introduced. Computer type circuits are used throughout the patent applications to which reference is made and a detailed explanation of the circuits themselves and of the modifications thereof are not considered necessary because of the present state of the art. Throughout the description of operation no reference is made usually to passive elements such as to cathode followers, level setters and the like. It is obvious that the characteristics of these elements vary and are largely determined not only by the component load but also by the length of conductors coupling one circuit to another.

FLOATING POINT OPERATION

Assume a two instruction program of Clear and Add (CLA) and Floating Add (FAD) Y+1. CLA provides that the contents of the Accumulator are replaced by the contents of address Y in Core Storage 1.01. This instruction consumes an I cycle and an E cycle, and during the E cycle the content of Storage location Y is first brought into the Storage Register 1.02. The data in locations 1 through 35 of the Storage Register are then placed in corresponding positions of the Accumulator 1.05 via the Adders 1.03. The content of the S position of the Storage Register is transferred to the S position of the Accumulator. The FAD instruction causes the numbers in the Accumulator and in Storage location Y+1 to be added.

Figure 2:
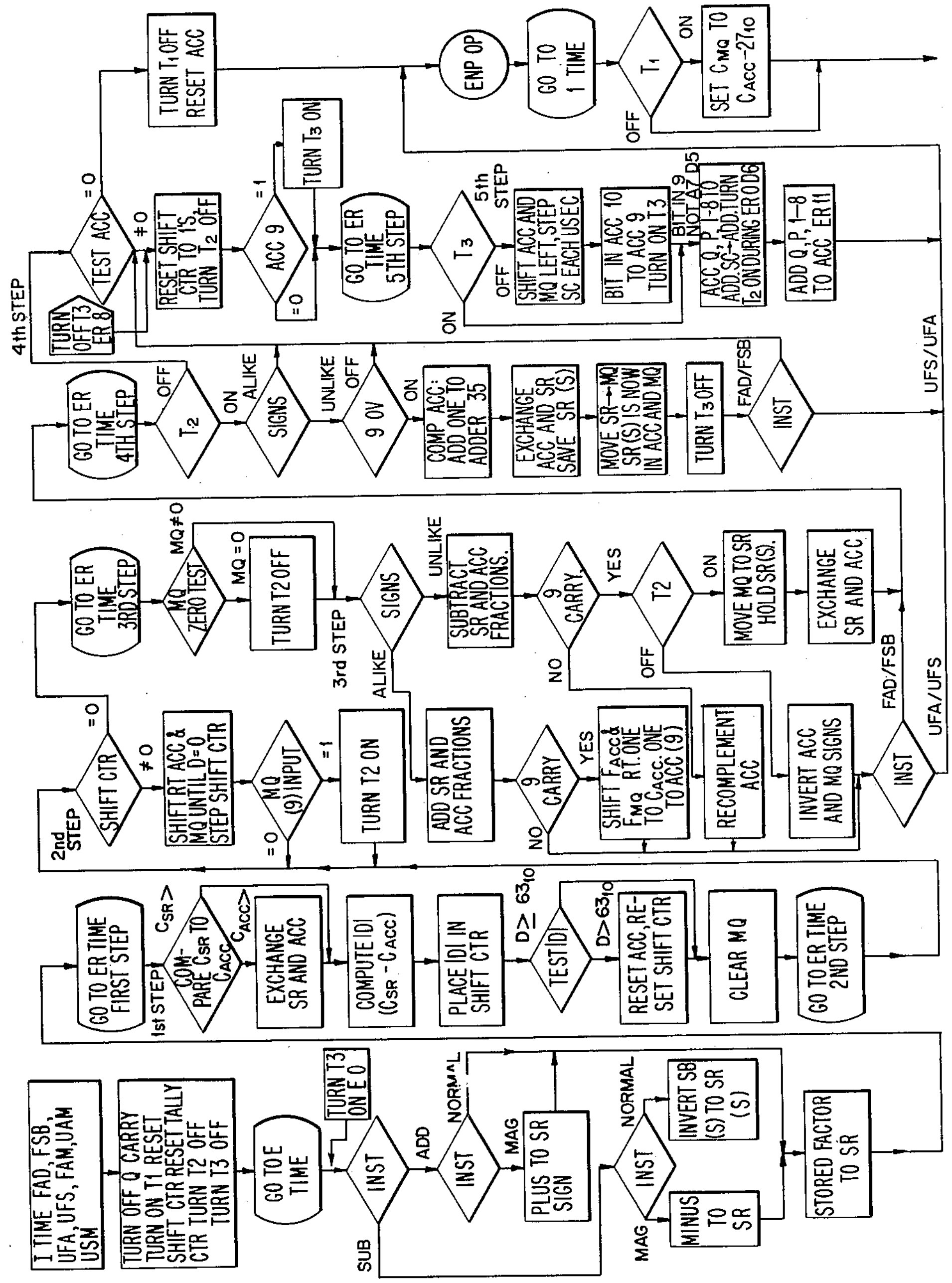
FIGURE 2 is a flow chart illustrating the operations performed in Floating Point Operations including the normalizing operation.

More specifically, the FAD operation is shown in the flow diagram of FIGURE 2 and proceeds as follows:

(1) The MQ register is cleared to zeros.

(2) The C (Y) are placed in the SR.

(3) If the characteristic in the SR is less than the characteristic in the AC, the C (SR) and C $(AC)_{S,\,1\text{-}35}$ are interchanged, as the number with the smaller characteristic must appear in the AC before addition can take place.

(4) The MQ is given the same sign as the AC.

(5) If the difference in the characteristics is greater than 63, the C (AC) are cleared. If the difference in the characteristics is a number N less than or equal to 63, the C $(AC)_{9\text{-}35}$ are shifted right N places. Bits shifted out of position 35 of the AC enter position 9 of the MQ. Bits shifted out of position 35 of the MQ are lost.

(6) The characteristic in the SR replaces the $C\ (AC)_{1-8}$.

(7) The $C\ (SR)_{9-35}$ are added to the $C\ (AC)_{9-35}$ and this sum replaces the $C\ (AC)_{9-35}$. If the signs of the AC and SR are unlike, the $C\ (SR)_{9-35}$ are added to the 1's complement of the $C\ (AC)_{9-35}$. Since the $C\ (AC)_{9-35}$ represent a pure fraction, the magnitude of their 1's complement is equal to $(1-2^{-27})-C(AC)_{9-35}$.

(8) Regardless of the sign or relative magnitudes of the SR and AC, the result appears in double-precision form with signs alike in both the AC and MQ. If the signs of the AC and SR are the same and the magnitude of the sums of the fractions is greater than or equal to one, there is a carry from position 9 into position 8 of the AC. Thus, the characteristic of the AC is increased by one. In this event, the fractions of the AC and MQ are shifted right one position and a 1 is inserted into position 9 of the AC. If the signs of the AC and SR are different, there are two cases, both depending on the difference between the SR and AC fractions.

*Case 1.*—If the magnitude of the SR fraction is greater than the fraction in the AC, the AC and MQ signs are both changed to the sign of the SR. If the fraction of the MQ is zero, the difference between the fractions of the SR and AC is placed in the AC. If the fraction of the MQ is not zero, the difference between the fractions of the SR and AC, minus one, is placed in the AC; the 2's complement of the MQ fraction replaces the fraction in the MQ.

*Case 2.*—If the magnitude of the SR fraction is less than the fraction in the AC, the difference of the two fractions replaces the fraction of the AC.

The sign of the AC and the entire MQ remain unchanged.

(9*a*) If the resulting fractions in both the AC and MQ are zero, the AC is cleared, yielding a normal zero. If the fractions are in normalized form before the FAD is given, this result can only occur if the signs are different and the $C(Y)_{1-35}$ are equal to the $C\ (AC)_{1-35}$. The signs of the AS and MQ will be equal to the sign of the number originally in the AC. If the resulting fraction in the AC is zero and the two numbers were not in normalized form before addition, the signs of the AC and MQ are equal to the sign of the original number having the smaller characteristic.

(9*b*) If the resulting fractions in the AC and MQ are not zero, the fractions of the AC and MQ are shifted left until a 1 appears in position 9 of the AC. Bits enter position 35 of the AC from position 9 of the MQ. The characteristic in the AC is reduced by one for each position shifted. No shifting is necessary if the fraction of the AC is in normal form at the beginning of this step.

(10) The MQ is given a characteristic which is 27 less than the characteristic in the AC, unless the AC contains a normal zero, in which case zeros are left in positions 1–8 of the MQ.

If the P and/or Q positions of the AC are not zero before the execution of the FAD, the result will usually be incorrect. Non-zero bits in P and/or Q which are initially interpreted as part of the AC characteristic make it larger than the characteristic in the SR so that the interchange in step 3 will always take place. During the interchange a 1 will be placed in position S of the SR if there is a 1 in either S or P positions of the AC, so that the sign of the number may be changed. Any bit in Q is lost during the interchange and both P and Q are cleared when the C (SR) replace the C (AC). The difference between the two characteristics is computed after the interchange occurs, so that in step 5, N will not be equal to the difference between the original characteristics. In step 6 the characteristic in the SR, with its Q and P bit missing, replaces the characteristic in the AC. Consider as a sample problem the addition of:

$$2^2\times.1001=(SR)+10000010.1001$$
$$2^5\times.1001=(AC)+10000101.1001$$

First, the exponents must be equalized and then the addition may proceed. The characteristics are checked and found unequal, with the largest in the AC. The numbers in the AC and SR are then exchanged, giving:

SR +10000101.1001
AC +10000010.1001

The MQ content is zeros at this time. The AC is then shifted right the number of places needed to equalize the exponents. (Remember that the binary point is located between positions 8 and 9 of all registers.) The registers then appear as:

SR +10000101.1001
AC +10000101.0001
MQ +00000000.0010

The fractions (positions 9–35) may now be added.

SR +10000101.1001
AC +10000101.1010
MQ +00000000.0010

AC position 9 is checked for a 1 and no normalizing occurs. The MQ characteristic is now set. It is equal to the AC characteristic minus the number of places on the AC fraction (27 in the computer, 4 in this example):

SR +10000101.1001
AC +10000101.1010
MQ +10000001.0010

Decoding the results into the original format, we find:

$$\begin{array}{l} 2^5\times.1001 \\ 2^5\times.0001001 \\ \hline 2^5\times.1010001 \end{array} \qquad \begin{array}{ll} MQ=2^1\times.0010= & 2^5\times.00000010 \\ AC= & 2^5\times.1010 \\ \hline \text{resultant sum}= & 2^5\times.10100010 \end{array}$$

For a more detailed example, consider the addition of two numbers $(6)_{10}$ and $(12)_{10}$ whose sum is $(18)_{10}$.

$$A=(6)_{10}=(203.6)_8=(206.06)_8$$
$$B=(12)_{10}=(204.6)_8=(207.06)_8$$

and $$C=(18)_{10}=205.44 \text{ (normalized)}$$

In the binary notation:

| S | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| A0 | 1 | 0 | 0 | 0 | 0 | 1 | 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| B0 | 1 | 0 | 0 | 0 | 0 | 1 | 1 | 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| C0 | 1 | 0 | 0 | 0 | 0 | 1 | 0 | 1 | 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Characteristic | | | | | | | | | Fraction | | | | | | | | | | | | | | | | | | | | | | | | | | |

Let A be located at Storage Address 1000, B be located at Storage Address 1001, CLA 1000 be located at Storage Address 100, FAD 1001 be located at Storage Address 101 and the Data Processing System so conditioned that the Instruction Counter 1.24 causes the contents of Storage Address 100 to be obtained from Core Storage 1.01. CLA is decoded by the Instruction Register 1.20 and decoder circuits during the Instruction cycle to extract the contents of Storage Address 1000 and place $(206.06)_8$ in the Accumulator 1.05 with the imaginary point between characteristic and fraction located between positions 8 and 9 of the Accumulator. The Instruction Counter 1.24 has been stepped to 101 and during the Instruction cycle following the CLA E cycle, the FAD instruction is obtained from Storage Address 101 and decoded. The FAD instruction provides that an E cycle be taken and the contents of Storage Address 1001 be extracted, which is the number $(207.06)_8$, and initially placed in the Storage Register 1.02. Next, five ER cycles are taken corresponding to five steps. The MQ is reset during the E cycle and the first step begins (ER 1).

During the first step a check is made to determine whether the characteristic in the Storage Register or the Accumulator Register is the larger. In this case, the Accumulator characteristic is the larger so the two numbers are exchanged by transfer of the number $(207.06)_8$ from the Storage Register 1.02 to the Accumulator 1.05 via the Adders 1.03 and by transfer of the number $(206.06)_8$ from the Accumulator to the Storage Register via the path 1.34. Thus, the Storage Register contains $(207.06)_8$ and the Accumulator contains $(206.06)_8$. Next, the characteristics are sent to the Adders via lines 1.54 and 1.46 and the difference computed. The difference of 1 is entered in the Shift Counter 1.20A via path 1.66, Storage Address Controls 1.26, and path 1.98. The first step has been completed.

During the second step, the Accumulator characteristic is made equal to the Storage Register characteristic by shifting the fraction in the Accumulator right by the amount designated in the Shift Counter. In this case, the fraction in the Accumulator is shifted right one place so that the number contained therein is $(206.03)_8$; however, the characteristic is not the true characteristic so no adjustment has been made to correct it for the shift right one place.

The two numbers are positive, and they are simply added during the third step. $(06)_8$ and $(03)_8$ yield a result of $(11)_8$. Knowing that the fraction in the Accumulator was adjusted to have a characteristic of the value of the characteristic in the Storage Register, the latter is passed through the Adders into the Accumulator (positions 1 through 8) to wipe out the former contents which were incorrect as mentioned previously. At the end of step 3, the number 207.11 is present in the Accumulator, but this fraction is unnormalized since $(207.11)_8$ is 010000111.001001

Before normalizing the number above, the operations described in operation 8 of FAD are completed. In this case, the resulting fraction in the Accumulator and MQ registers are not zero. If the fraction in the Accumulator is already normalized (a "1" in position 9), a T–3 trigger is turned ON. Since such is not the case, T–3 remains OFF and the fifth step is taken to normalize the number. The Shift Counter is reset to "ones." The circuits are arranged to continuously examine position 10 of the Accumulator because presensing provides that shifting will cease after one more shift out of position 10. Thus, the first "1" will come to rest in position 9 of the Accumulator. The presensing principle and circuits therefor are completely described in copending application Serial No. 705,442, filed December 26, 1957. Each time a shift left is performed, the Shift Counter is stepped one. In this instance, there are two shifts and the fraction changes from $(11)_8$ to $(44)_8$. When the Shift Counter was reset to "ones," it registered $(377)_8$ so that after two shifts it contains the value $(375)_8$.

Since the Shift Counter is only an eight position counter which has positions 10 through 17 corresponding to Adder positions 1 through 8 "ones" are forced into positions Q and P of the Adder. If the Shift Counter were enlarged to include positions 8 and 9, these positions would be holding "ones" so it is perfectly acceptable to place so-called "hot ones" in Adders Q and P. Because the complement of the number of shifts $(375)_8$ is being added to the characteristic $(207)_8$, a "hot one" must be entered in position 8 of the Adder to adjust to the twos complement.

Accordingly, the following numbers are added:

| | Adder Positions Q P 1 2 3 4 5 6 7 8 |
|---|---|
| Accumulator | 0 0 1 0 0 0 0 1 1 1 |
| Shift Counter plus "ones" in Q and P | 1 1 1 1 1 1 1 1 0 1 |
| Hot "one" to Adder 8 | 1 |
| | 0 0 1 0 0 0 0 1 0 1 |

The result is $(205)_8$ and the number is placed in the Accumulator replacing the characteristic $(207)_8$. The Accumulator now contains $(205.44)_8$.

LOGICAL CIRCUITS FOR FLOATING POINT OPERATIONS

The following is a tabulation of the logical circuits of the invention with corresponding figure numbers for application Serial No. 705,442, filed December 26, 1957, and referred to previously, shown in the column at the right:

| | |
|---|---|
| FIGURES 3*a*, *b* and *c* | FIGURES 6*c*, *d* and *e* respectively. |
| FIGURE 4 | FIGURE 7*c*. |
| FIGURE 5 | FIGURE 13*d*. |
| FIGURE 6 | FIGURE 21*a*. |
| FIGURE 7 | FIGURE 21*g*. |
| FIGURE 8 | FIGURE 43. |
| FIGURE 9 | FIGURE 48. |
| FIGURE 10 | FIGURE 55*a*. |
| FIGURE 11 | FIGURE 57*a*. |
| FIGURE 12 | FIGURE 58. |
| FIGURE 13 | FIGURE 60. |
| FIGURE 14 | FIGURE 65. |
| FIGURE 15 | FIGURE 79. |
| FIGURE 16 | FIGURE 81. |
| FIGURE 17 | FIGURE 82. |
| FIGURE 18 | FIGURE 88*a*. |
| FIGURE 19 | FIGURE 102. |
| FIGURE 20 | FIGURE 122*h*. |
| FIGURE 21 | FIGURE 122*o*. |
| FIGURE 22 | FIGURE 122*p*. |
| FIGURE 23 | FIGURE 124. |

In FIGURES 3*a*, 3*b* and 3*c*, there is shown the data paths from the Shift Counter position (10–17) of the Instruction Register and the gating control lines for admitting the data. In FIGURE 3*a*, a line **3*a*.05 is connected to positions 11 and 13 for Adder positions 2 and 4 respectively. A line 3*a*.06 gates the binary input from the line 3*a*.05** into the Adder. Sum and Carry outputs are provided as shown. In FIGURE 3*b*, a line **3*b*.06 is connected to Shift Counter positions 12 and 14 for Adder positions 3 and 5 respectively, and a line 3*b*.07 gates the binary input from the line 3*b*.06 into the Adder. Similarly, a line 3*c*.07 is gated by a line 3*c*.08** for the Shift Counter positions 15, 16 and 17 to Adder positions 6, 7 and 8 respectively.

In FIGURE 4, a typical position of a fraction portion of the Accumulator is shown including a line 4.8 for position 10 only which is used for presensing a "1" in the microsecond delay unit when normalizing, as described previously.

FIGURE 5 shows the Shift Counter 1.20A with output lines 5.1 through 5.8 which are connected to positions 1 through 8 of the Adders 1.03 to provide the path 1.96.

FIGURE 6 (sheet 1) provides an output line 6.3 which goes to FIGURE 9 to turn ON the $T_2$ trigger. A line 6.1 energized from FIGURE 7 and a timing line 6.02, Minus on A7 (D5), are combined to provide this output.

In FIGURE 7, a line 7.1 goes to FIGURE 9 where it is combined with an ER 11 (D1) pulse to turn OFF the $T_2$ trigger during step 4. A line 7.2 goes to FIGURE 19 where it is used with an ER Time line 19.1 and an A8 (D1) line 19.2 to turn ON the trigger and reset the Shift Counter to "ones." A line 6.1 is brought up by positive signals on the FP Add/Subtract line 7.10 and the 5th Step line 7.11 to provide a signal to FIGURE 6 as described previously. A line 7.3 is conditioned by the line 6.1 and an Acc Col (9) Output line to provide a signal to FIGURE 11 where it is used with $T_2$ ON to transfer the contents of the Adders Q–8 to the Accumulator to adjust the characteristic. A line 7.6 goes to FIGURE 17 where it is used to generate the "hot one" in the 8 position of the Adder via the Carry to Adder (8) line. The line 3*a*.06 goes to FIGURE 3*a* to gate the Instruction Register N output as described previously. The line 3*b*.07 goes to FIGURE 3*b* where it is used to gate the Instruction Register N output also. A line 3*c*.08 goes to FIGURE 3*c* where it is used to gate the Instruction Register N signal on the line 3*c*.07.

In FIGURE 8, an output line 8.1 goes to FIGURE 15 to indicate $T_3$ OFF. A line 8.2 goes to FIGURE 18 where it energizes the 5th Step lines 18.1, 18.2 and 18.3. An input line 8.3 is energized by an ER 0 (D4) pulse to provide gating for the line 8.2 along with the $T_3$ OFF line 8.1 and a FP Add/Sub line 8.4. A line 8.5 is a Multiply-Presensing Drive line having the function of insuring that the fall of a cathode follower 8.6 coincides as closely as possible to the fall of the Clock pulse. A line 8.6 comes from FIGURE 12 where it is provided during the Fifth Step with $T_3$ OFF to begin normalizing the fraction in the Accumulator. The line 4.8 Accumulator 10 Output comes from FIGURE 4 as mentioned previously in connection with presensing a "one" in position 10 of the Accumulator. A line 8.7 comes from FIGURE 7 being positive for an FP Add/Subtract operation during the Fifth Step. The lines 8.5, 8.6, 4.8 and 8.7 are ANDed to turn $T_3$ OFF when Accumulator position 10 contains a "1."

In FIGURE 8, a line 8.8 is energized from FIGURE 7 by Floating Point Add/Subtract and Fourth Step; a line 8.9 is energized from position 9 of the Accumulator when it contains a "1"; and a line provides a timing pulse at ER 10 (D1). An FP Add/Subtract line 8.11 and an E0 (D4) line 8.12 are combined to furnish a signal to the cathode follower 8.6. A line 8.13 is positive for FP Add/Sub during the Fourth Step from FIGURE 7 and gates an ER 8 (D2) on a line 8.14 to turn ON $T_3$ during the Fourth Step at 8 time of the cycle.

In FIGURE 9, a signal on the line 7.1 is combined with an ER 11 (D1) pulse to turn $T_3$ ON at 11 time of the Fourth Step and provide a signal to FIGURE 7 on a line 7.12.

In FIGURE 10 a line 6.1 is fed by FIGURE 7 where Fifth Step and FP Add/Sub are combined to furnish a signal. The line 6.1 energizes output line, True Accumulator (Q, P, 1–8) to Adder to calculate a new characteristic after normalized in the manner described before.

In FIGURE 11, the line 7.3, the line 7.2 and an ER 11 (D1) line 11.1 provide a positive signal on the Adders (Q–8) to Accumulator lines 11.1 through 11.4, the latter line causing the adjusted characteristic to be placed in the Accumulator after normalizing at 11 time of the Fifth Step.

In FIGURE 12, the output line 8.06 is energized via a line 15.1 from FIGURE 15 to initiate shifting the Accumulator positions 9 through 35, left to normalize on the Fifth Step with $T_3$ OFF. In FIGURE 13, a line 15.4 when energized provides a signal on the output line 13.2 to control MQ (S), (1) or (9) to Accumulator 35.

Referring now to FIGURE 14, a line 14.1 is conditioned from FIGURE 15 to control Shift MQ Left Output lines 14.2 through 14.9 . In FIGURE 5, a machine cycle gate, ER 5 or ER 11 (D1), line 15.2 is energized from the Pulse and Gate Generator of FIGURE 22. A Fifth Step line 18.2 is energized from the Floating Point Tally Counter of FIGURE 18 and the $T_3$ OFF line 8.1 is energized from FIGURE 8. It will also be noted that a line 15.5 provides the output of lines 15.1, 14.1 and 15.4 to a Step Shift Counter line 15.6, the latter going to FIGURE 19 to control stepping of the Shift Counter as the fraction is being normalized in the Accumulator.

In FIGURE 16, the line 6.1 provides "hot ones" to Adders Q and P via the lines 16.1 and 16.2. In FIGURE 7, the line 7.5 provides a signal on a Carry to Adder 8 line 17.1 to furnish a "hot one" to Adder 8 for the two's complement.

In FIGURE 18, the Floating Point Tally Counter is shown for providing the signals to distinguish the various steps in the Floating Point operation. The line 8.2 may energize the Fifth Step lines 18.1, 18.2 and 18.3 or the Inverter 18.4 may energize these output lines when the First through Fourth Step triggers are OFF.

In FIGURE 19, the Step Shift Counter line 19.1 conditions an AND circuit for the passage of the Shift Counter Drive line pulses on a line 19.2. The time pulses are provided on an output line 19.03 which goes to the Shift Counter of FIGURE 5 (Sheet 2). Also shown in FIGURE 19 is the trigger for resetting the Shift Counter to "ones." The trigger is turned ON either during I time at A8 (D1) or during the Fourth Step, and ER time at A8 (D1). The trigger is turned OFF with an A11 (D1) pulse to reset the Shift Counter to "ones" at 11 time of the Fourth Step.

In FIGURE 21, a line 19.1 provides an ER time signal to the Shift Counter Pulse Generator, and in FIGURE 22 the line 15.2 is energized by the Machine Cycle gate at ER 5 or 11 to provide a signal to FIGURE 15.

In summation, during Step 4, $T_3$ is turned ON at 8 time. In Case 1, where Accumulator 9 position is "1" before or at 7 time of the Step 4 cycle, $T_3$ is turned ON at 8 time and turned OFF at 5 time of the Fifth Step when Accumulator 10 is at "1." Accumulator 9 is at "1" one microsecond after Accumulator 10 is at "1." Shift MQ and Accumulator Left and Step Shift Counter is up at 0 of the Fifth Step and down at 5 of the Fifth Step. Instruction Register (10–17) to Adder (1–8), Ones to Adders Q, P and Carry to Adder 8 comes up at 6 time of the Fifth Step. $T_2$ is turned OFF at 0 time of the Fifth Step and turned ON at 7 time to cause end of operation. Adders to Accumulator (Q–8) comes up at 11 time of the Fifth Step and goes down at 0 time immediately thereafter. Accumulator to Adder (Q–8) comes up at 0 time of the start of Step 5 and continues up until the end of operation. In Case 2, Accumulator 9 position is at "1" after 7 time. Accumulator 10 position is at "1" at 6 time of the first cycle of Step 5 and $T_3$ is turned OFF at 6 time. Accumulator 9 position is at "1" at 7 time. In this instance Shift Left and Step Shift Counter comes up at 0 time of Step 5 (as before) but goes down at 6 time. Now, Instruction Register to Adders, Ones to P and Q, of Adder and Carry to 8 of Adder come up at 7 time. $T_2$ is turned ON at the second 0 time of the Fifth Step and initiates an end of operation. However, another cycle is taken (cycle 2 of Step 5) and the Adders to Accumulator (Q–8) comes up at 11 time of the second cycle. Accumulator to Adders (Q–8) comes up at 0 time of the first cycle and remains up until the completion of the operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system, apparatus comprising first means storing signals representing a fraction in the binary notation adapted to shift the signals relative to themselves and place the fraction in normalized form, in which all zeroes between the decimal point position and the first sign digit are eliminated, second means storing signals representing a characteristic associated with the fraction, counting means operably associated with said first storing means for counting the number of shifts taken to normalize the fraction, arithmetic means coupled to said second storing means and said counting means for deriving signals representing a new characteristic from the signals representing the count and the characteristic, and execution means for first initiating shifting of said first storing means to normalize the fraction and then for operating said arithmetic means.

2. In a data processing system, apparatus comprising means including a register having a plurality of orders including an end order representing a reference point to which signals representing a fraction in the binary notation of zero and one are related by denominational order, said register adapted to shift the signals order by order in response to a control signal until a binary one is stored in the order adjacent said end order, means storing signals representing a characteristic associated with the fraction as initially stored in said register, counting means operably associated with said register for counting during shifting the number of orders shifted, arithmetic means coupled to said storing means and said counting means for deriving signals representing the characteristic modified by the number of shifts as accounted for by said counting means, and means for providing the control signal to said register and for operating said arithmetic means after a binary one is stored adjacent the end order of said register.

3. In a data processing system, apparatus comprising means including a plural order register storing signals representing a fraction in the binary notation of zero and one adapted to shift the signals order by order in response to a control signal until a binary one is stored in the highest order of said register, means storing signals representing a characteristic associated with the fraction initially stored in said register, counting means operably associated with said register for counting during shifts of said register signals the number of shifts of said signals, arithmetic means coupled to said storing means and said counting means for deriving signals representing the characteristic adjusted by the value provided by said counting means, and execution means for providing a control signal to said register and for operating said arithmetic means after a binary one is stored in the highest order of said register.

4. In a data processing system, apparatus comprising storage means including a first and a second plural order register, said first register storing signals representing the fractional part of a word in the binary notation of zero and one and adapted to shift the signals order by order in response to an execution signal until a binary one is stored in the most significant order of said first register, said second register storing signals representing the characteristic portion of the word, counting means operably associated with said first register for detecting and recording the number of orders shifted in said first register, arithmetic means coupled to said second register and said counting means for receiving signals therefrom, for computing a characteristic from the received signals to define the magnitude of the fractions as shifted and for providing signals representing the adjusted characteristic to said second register, and means for successively providing the execution signal to said first register, operating said arithmetic means when a binary one is stored in the most significant order of said first register, and storing the signals from said arithmetic means in said second register.

5. In a data processing system having execution means for providing signals to control an operation in response to an instruction, arithmetic means for manipulating binary data words in the form of exponents and fractions in response to signals from said execution means and including a plural order storage device having an exponent portion and a fraction portion, said fraction portion adapted to shift selectively its contents in a direction so that the numerical value of the fraction is increased to normalize the fraction in response to said execution signal until a binary one is shifted into the highest order, and means for providing signals representing an exponent and a fraction to said arithmetic means, the latter storing signals representing the exponent and the fraction in said storage device, apparatus comprising a counter coupled to said arithmetic means for counting during shifting the number of shifts of said fraction in said fraction portion of said storage device and means responsive to said execution means for providing signals representing the count in said counter to said arithmetic means, said arithmetic means being responsive upon shifting of said binary one into said highest order to said execution means for adjusting the exponent in said exponent portion of said storage device by the count in said counter.

6. In apparatus for processing floating point binary data words having an exponent part and a fraction part, each word being composed of a number of binary orders each order containing either a zero-bit or a one-bit; means for eliminating zero-bits contained in data word fraction part orders higher than the highest fraction part order containing a one-bit, including: A plurality of stores, arranged into ordered series comprising an exponent group and a fraction group, each store operable to hold either a one-bit or a zero-bit; a plurality of shifting means each connected to a different pair of adjacent ones of said fraction group stores operable, by a shifting signal, to transfer bits held in each order of said fraction group stores to the adjacent higher order; input means for supplying a floating point binary data word exponent part and fraction part; means connecting said input means and said plurality of stores, said data word fraction part being supplied to said fraction group stores and said data word exponent part being supplied to said exponent group stores, each one of said stores being operated to hold the bit contained in a corresponding order of said supplied binary word; binary counter means having an input for receiving increment signals and an output for emitting binary count representative signals; an adder having a first input connected to said counter output, a second input connected to said exponent group stores and an output connected to said exponent group stores, operable, by an add signal, to generate a sum of the binary value of the bits held in said exponent group stores and the binary count represented by said counter emitted signals, and operable to replace said binary value in said exponent group stores with said sum; sensing means connected to the highest order fraction group store, to said shifting means and to said adder operable to supply a shift signal to said shifting means when aforesaid store holds a zero-bit and an add signal to said adder when aforesaid store holds a one-bit; first means connected to said sensing means, to said counter and to said shifting means for supplying said sensing means shift signal to said counter input and to said shifting means, operable to essentially simultaneously shift the bits held in said orders of said fraction group stores to said adjacent higher orders and to increment said counter, once for each consecutive zero-bit sensed; second means connected to said sensing means, to said counter and to said shifting means, operable to terminate said incrementing and shifting when said highest order one-bit is sensed; and third means connected to said sensing means and to said adder for supplying said sensing means add signal to said adder, said adder being operable upon the sensing of said highest order one-bit, to sum said counter binary count and the binary value held in said exponent group stores and enter said sum into said exponent group stores.

References Cited in the file of this patent

UNITED STATES PATENTS 2,538,636 Williams ---------------- Jan. 16, 1951